(12) United States Patent
Wu et al.

(10) Patent No.: US 12,536,228 B2
(45) Date of Patent: Jan. 27, 2026

(54) SEARCH RESULT REORDERING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Tianyu Wu, Shenzhen (CN); Rui Hua, Shenzhen (CN); Aihu Zhang, Shenzhen (CN); Yao Meng, Shenzhen (CN); Quan Wen, Shenzhen (CN); Chao Qi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/596,497

(22) Filed: Mar. 5, 2024

(65) Prior Publication Data
US 2024/0211512 A1 Jun. 27, 2024

Related U.S. Application Data

(63) Continuation of application No. PCT/CN2023/088560, filed on Apr. 17, 2023.

(30) Foreign Application Priority Data

Jul. 28, 2022 (CN) .......................... 202210898103.9

(51) Int. Cl.
*G06F 16/738* (2019.01)
*G06F 16/732* (2019.01)
*G06F 16/735* (2019.01)

(52) U.S. Cl.
CPC ........ *G06F 16/738* (2019.01); *G06F 16/7335* (2019.01); *G06F 16/735* (2019.01)

(58) Field of Classification Search
CPC ... G06F 16/738; G06F 16/7335; G06F 16/735
(Continued)

(56) References Cited

U.S. PATENT DOCUMENTS 8,312,009 B1 * 11/2012 Bostock .............. G06F 16/9535
707/723
10,097,973 B2 * 10/2018 Gross ...................... H04W 4/50
(Continued)

FOREIGN PATENT DOCUMENTS

CN 103793388 A 5/2014
CN 107506402 A 12/2017
(Continued)

OTHER PUBLICATIONS

Tencent Technology, ISR, PCT/CN2023/088560, Jun. 23, 2023, 3 pgs.

*Primary Examiner* — Tony Mahmoudi
*Assistant Examiner* — Michael Le
(74) *Attorney, Agent, or Firm* — Morgan, Lewis & Bockius LLP

(57) ABSTRACT

A computer device performs a search result reordering method. The computer device displays a search result page corresponding to a search session, the search result page displaying a first content sequence obtained based on a search keyword corresponding to the search session, and the first content sequence including a plurality of media contents. After obtaining at least one real-time interactive behavior performed by a target object on the search result page, the computer device determines media contents other than a target media content associated with the at least one real-time interactive behavior as to-be-sorted media contents in the first content sequence; and reorders the to-be-sorted media contents to obtain a second content sequence when the at least one real-time interactive behavior satisfies a (Continued)

reordering trigger condition, and updates the search result page based on the second content sequence.

12 Claims, 15 Drawing Sheets

(58) Field of Classification Search
 USPC .......................................................... 707/733
 See application file for complete search history.

(56) References Cited

U.S. PATENT DOCUMENTS

| | | | | |
|---|---|---|---|---|
| 10,606,907 | B1* | 3/2020 | Peddinti | G06F 16/248 |
| 11,163,779 | B1* | 11/2021 | Kulikov | G06F 16/24568 |
| 2005/0080769 | A1* | 4/2005 | Gemmell | G06F 16/9038 |
| | | | | 707/999.102 |
| 2007/0208730 | A1* | 9/2007 | Agichtein | G06F 16/9535 |
| | | | | 707/999.005 |
| 2009/0119254 | A1* | 5/2009 | Cross | G06F 16/9535 |
| 2009/0119278 | A1* | 5/2009 | Cross | G06F 16/951 |
| | | | | 707/999.005 |
| 2011/0035406 | A1* | 2/2011 | Petrou | G06F 16/438 |
| | | | | 707/769 |
| 2014/0046922 | A1* | 2/2014 | Crook | G06F 16/3326 |
| | | | | 707/706 |
| 2014/0143245 | A1* | 5/2014 | Qiao | G06F 16/9038 |
| | | | | 707/728 |
| 2015/0242523 | A1* | 8/2015 | Gorskiy | H04L 67/75 |
| | | | | 707/706 |
| 2015/0293977 | A1* | 10/2015 | Perl | G06Q 30/0273 |
| | | | | 705/14.54 |
| 2015/0317319 | A1* | 11/2015 | Andress | G06F 16/3322 |
| | | | | 707/722 |
| 2015/0317354 | A1* | 11/2015 | Andress | G06F 16/2428 |
| | | | | 707/706 |
| 2016/0055252 | A1* | 2/2016 | Makeev | G06F 16/248 |
| | | | | 707/733 |
| 2017/0235706 | A1* | 8/2017 | Esterly | G06F 3/0481 |
| | | | | 715/243 |
| 2018/0011615 | A1* | 1/2018 | Alvino | H04N 21/482 |
| 2018/0060029 | A1* | 3/2018 | Kogan | G06F 16/248 |
| 2019/0171689 | A1* | 6/2019 | Kachkach | G06F 16/9038 |
| 2020/0249963 | A1* | 8/2020 | Yeh | G06F 9/45529 |
| 2020/0258417 | A1 | 8/2020 | Mallin et al. | |
| 2021/0034684 | A1* | 2/2021 | Iyer | G06F 16/9535 |
| 2021/0216820 | A1* | 7/2021 | Hu | G06F 16/9535 |
| 2023/0073754 | A1* | 3/2023 | Chen | G06F 18/2178 |
| 2023/0315781 | A1* | 10/2023 | Huang | G06F 16/535 |
| | | | | 707/734 |

FOREIGN PATENT DOCUMENTS

| | | |
|---|---|---|
| CN | 109033140 A | 12/2018 |
| CN | 111177551 A | 5/2020 |
| CN | 114722313 A | 7/2022 |
| CN | 115238126 A | 10/2022 |

* cited by examiner

SEARCH RESULT REORDERING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2023/088560, entitled "SEARCH RESULT REORDERING METHOD AND APPARATUS, DEVICE, STORAGE MEDIUM, AND PROGRAM PRODUCT" filed on Apr. 17, 2023, which claims priority to Chinese Patent Application No. 202210898103.9, entitled "SEARCH RESULT REORDERING METHOD AND APPARATUS, DEVICE, STORAGE MEDIUM, AND PROGRAM PRODUCT" and filed with the China National Intellectual Property Administration on Jul. 28, 2022, all of which is incorporated by reference in its entirety.

FIELD OF THE TECHNOLOGY

This application relates to the field of computer technologies, and in particular to the field of search technologies, and provides a search result reordering method and apparatus, a device, a storage medium, and a program product.

BACKGROUND OF THE DISCLOSURE

With development of Internet technology, short videos gradually become a common way to obtain information. The short videos are video communication contents that are usually spread within a time length of 5 minutes on a short video platform. Generally speaking, due to openness of the short video platform, a large number of creators upload short videos through the short video platform. Therefore, there are massive short videos in the short video platform. In this case, in response to short video searching, how to select short videos that satisfy search criteria from the massive short videos, to understand a search intention of a target object, and to put the most desired result of the target object in a front position, to achieve accurate search result recommendation is always a concern of the short video platform.

However, because a library of the massive short videos may include different types of short videos related to the search criteria, there may be different types of short videos in a list of short videos found in related art, and the search intention of the target object may be one of the different types. For example, when the target object searches for "cool", short videos related to "The special effects are cool" or "The special effects are amazing" may appear. Although search keywords are the same, the short videos belong to different types of short videos. Therefore, due to intermixing of multiple types of short videos, the target object cannot quickly find short videos the target object wants to watch, which greatly increases a time length spent in finding the short videos the target object wants to watch, resulting in poor search efficiency.

Similarly, in addition to the short videos, search for other form of media contents also has the above mentioned problems.

SUMMARY

Embodiments of this application provide a search result reordering method and apparatus, a device, a storage medium, and a program product, for improving accuracy of search result presentation and improve content search efficiency.

According to an aspect, a search result reordering method is performed by a computer device. The method includes:
displaying a search result page corresponding to a search session, the search result page including a plurality of media contents based on a search keyword corresponding to the search session;
obtaining at least one real-time interactive behavior performed by a target object on the search result page;
determining media contents other than a target media content associated with the at least one real-time interactive behavior as to-be-sorted media contents in the search result page; and
updating the search result page by reordering the to-be-sorted media contents when the at least one real-time interactive behavior satisfies a reordering trigger condition.

According to another aspect, a computer device is provided, including a memory, a processor, and a computer program that is stored in the memory and is executable on the processor, the processor, when executing the computer program, implementing steps of any of the foregoing methods.

According to another aspect, a non-transitory computer storage medium is provided, having a computer program stored thereon, the computer program, when executed by a processor of a computer device, implementing steps of any one of the foregoing methods.

BRIEF DESCRIPTION OF THE DRAWINGS

To describe the technical solutions in embodiments of this application or related art more clearly, the following briefly describes the accompanying drawings needed for describing embodiments or related art. Apparently, the accompanying drawings in the following description show merely embodiments of this application, and a person of ordinary skill in the art may still derive other drawings from the provided accompanying drawings without creative efforts.

DESCRIPTION OF EMBODIMENTS

Figure 1:
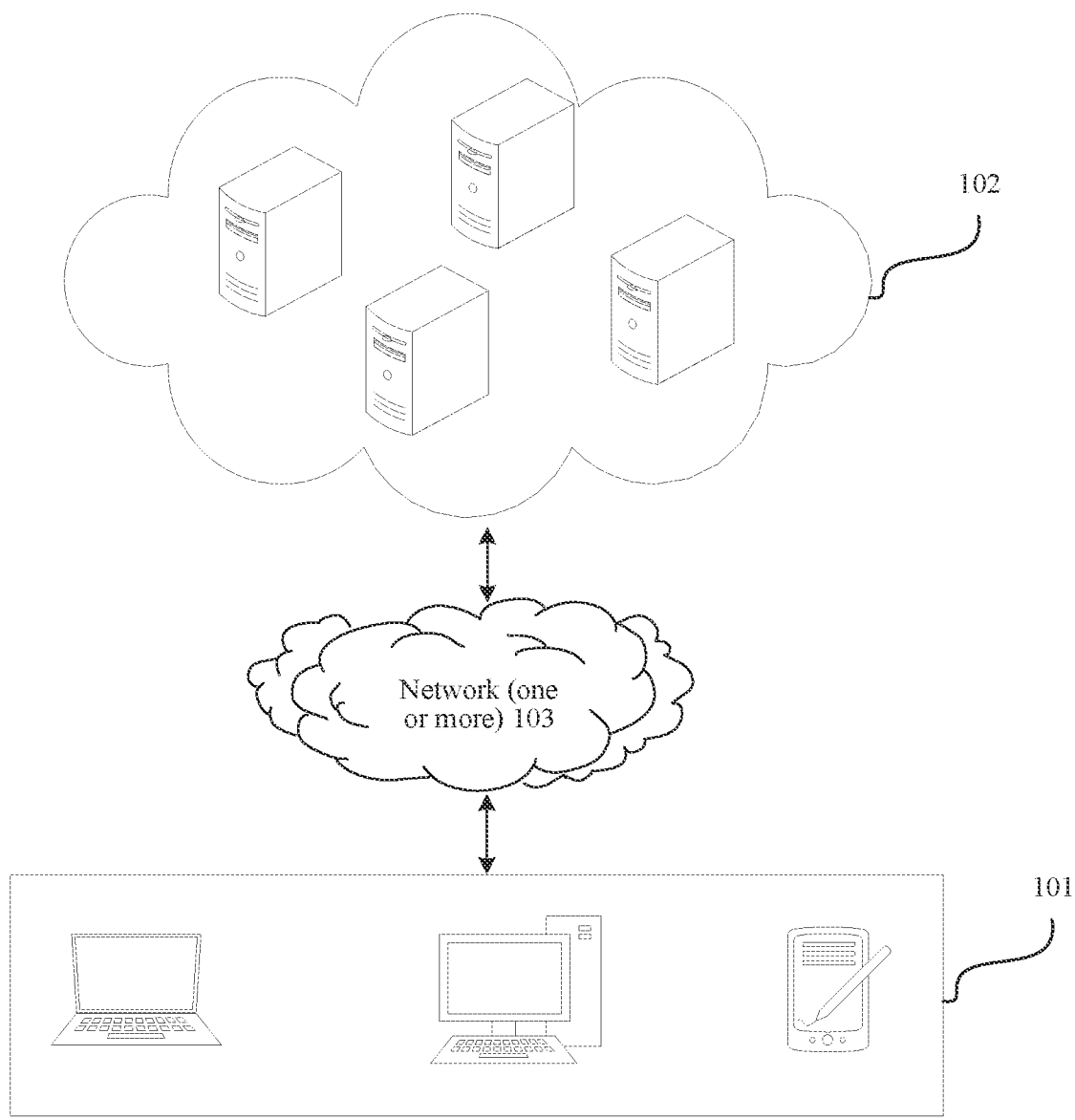
FIG. 1 is a schematic diagram of an application scenario according to an embodiment of this application.

To make the objectives, technical solutions, and advantages of this application clearer, the following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on embodiments of this application without creative efforts shall fall within the protection scope of this application. Embodiments of this application and features in the embodiments may be mutually combined when no conflict occurs. Moreover, although logic sequences are shown in the flowcharts, in some cases, the shown or described steps may be performed in sequences different from those herein.

It is to be understood that in the following specific implementations of this application, data related to a target object, such as interactive behavior data, is involved. When various embodiments of this application are applied to specific products or technologies, relevant permissions or consents are required. Collection, use and processing of relevant data need to comply with relevant laws, regulations and standards of relevant countries and regions. For example, when relevant data is needed to be obtained, relevant volunteers may be recruited and relevant agreements for volunteer authorization data are signed, so that data of these volunteers is used for implementation. Alternatively, implementation is performed within a scope of an authorized organization. Data of internal members of the organization is adopted to implement the following implementations to make relevant recommendations to the internal members. Alternatively, relevant data used in specific implementation is simulation data, for example, may be simulation data generated in a virtual scene.

For ease of understanding of the technical solutions provided in embodiments of this application, some key terms used in embodiments of this application are first explained.

Media content: A media content refers to information transmitted via a multimedia technology. In embodiments of this application, the media content may be any possible content that can be recommended to the target object when the target object performs a search, including, but not limited to, a picture, an article (such as news and information), an audio, a video (including a long-form video and a short video), a commodity, and the like.

Terminal-cloud collaboration: In a search reordering scenario of embodiments of this application, terminal-cloud collaboration refers to a reordering framework. A client performs feature extraction and determines timing of triggering reordering, and a cloud is responsible for actual reordering logic. The cloud and the client perform respective duties to complete a reordering process together.

Search session: It refers to a complete search process, including a process from triggering a search to exiting this search result (such as exiting a search result page and changing a search keyword) by the target object. For example, the search session refers to a process from taping a search button by the target object to initiate a search request, and displaying a search result page, until exiting the search result page.

Real-time interactive behavior: It refers to a series of interactive behaviors of the target object in the process of browsing a video and other contents. The interactive behaviors include, but are not limited to, swiping up, sliding down, page turning, taping, liking, following an author, commenting, quick slashing, and the like. The real-time interactive behavior may be given different definitions in actual application scenarios. A video scenario is used as an example here:

In a possible implementation, the real-time interactive behavior is an interactive behavior generated during a browsing process of a current video, and may include, for example, liking, commenting, pulling a progress bar, playing a progress, forwarding and other behaviors performed on the current video. Correspondingly, a historical interactive behavior may be an interactive behavior before the real-time interactive behavior. For example, the historical interactive behavior is an interactive behavior generated during a browsing process of other videos in front of the current video in a video sequence browsed by the target object. The other videos may be browsed videos in this search session other than the current video, or may alternatively include browsed videos outside of this search session, that is, videos browsed before entering this search session.

In another possible implementation, the real-time interactive behavior may be, for example, an interactive behavior generated during this search session, and a historical interactive behavior may be an interactive behavior generated before this search session.

In another possible implementation, the real-time interactive behavior may be an interactive behavior performed within a short time period from the current moment, corresponding to a historical interactive behavior performed by the target object within a long time period from the current moment, and a time threshold may be adjusted as needed.

Average time length per search: It refers to an average time length for a search session lasts and is an indicator to measure a search result. In different scenarios, the average time length per search has different representation results. For example, for short videos, a short video platform hopes to provide short videos that the target object wants to watch more. Therefore, that the target object stays on the search result page for a longer time, that is, a longer average time length per search, means that the short videos on the short video platform are more attractive, and search experience and a service quality for the target object are better. For some other scenarios, such as a search in a browser, an intention of the target object is to search for a keyword-related result, and the target object hopes to search for a relevant content as soon as possible, so that a shorter average time length per search is better, representing that search efficiency of the target object is higher.

Multi-gate Mixture-of-Experts (MMoE): An MMoE may improve learning efficiency and quality of each task by learning connections and differences between different tasks. The MMoE widely uses a shared-bottom structure, and different tasks share a bottom hidden layer. The core idea of the MMOE is integrated learning. By introducing a Mixture-of-Experts (MoE) layer into multi-task learning, a relationship between sub-tasks is explicitly learned, and a threshold network is utilized to optimize tasks.

Transformer: Transformer is a deep learning model that uses a self-attention mechanism to weight importance of each part of input data differently. The Transformer is mainly used in the field of natural language processing (NLP) at first, and later expanded to other fields.

Content sequence: It refers to a sequence composed of media contents. In the sequence, the media contents are arranged in a certain order, for example, may be arranged based on a degree of interest of the target object or the interacted time.

Embodiments of this application relate to artificial intelligence and machine learning (ML) technologies, and are mainly designed based on machine learning in the artificial intelligence.

The artificial intelligence refers to a theory, a method, a technology, and an application system that simulate, extend and expand human intelligence by using a digital computer or a machine controlled by a digital computer, to perceive an environment, obtain knowledge, and use the knowledge to obtain an optimal result. In other words, the artificial intelligence is a comprehensive technology in computer science and attempts to understand the essence of intelligence and produce a new intelligent machine that can react in a manner similar to human intelligence. The artificial intelligence is to study the design principles and implementation methods of various intelligent machines, to enable the machines to have the functions of perception, reasoning, and decision-making.

The machine learning is the core of the artificial intelligence, is a basic way to make the computer intelligent, and is applied to various fields of the artificial intelligence. The machine learning and the deep learning generally include technologies such as an artificial neural network, a belief network, reinforcement learning, transfer learning, and inductive learning. Artificial neural network (ANN) abstracts a human brain neuron network from a perspective of information processing, establishes a certain simple model, and forms different networks according to different connection methods. A neural network is a computing model formed by a large quantity of nodes (or neurons) connected to each other. Each node represents a specific output function and is referred to as an activation function, and a connection between every two nodes represents a weighted value for a signal passing through the connection, referred to as a weight. This is equivalent to a memory of the artificial neural network. Output of the network varies depending on a connection method of the network, a weight value, and the activation function, and the network itself is usually an approximation of a certain algorithm or function in nature, or may be an expression of a logical policy.

Embodiments of this application relate to reordering and scoring media contents such as short videos, to obtain a new content sequence after reordering based on the score of each to-be-sorted media content, and the new content sequence is presented to the target object. In addition, predicting triggering timing of reordering is also involved. The reordering and the scoring are used as an example, in response to reordering and scoring the media content, it is necessary to use an artificial neural network model based on deep learning. In other words, in embodiments of this application, a machine learning method is used to obtain a reordering model for reordering and scoring the media contents. The reordering model measures long-term and short-term interests of the target object and expresses a search intention of the target object in this search session based on a capability of the machine learning to implement processing and understanding of a search intention of the target object, for example, based on a correlation between a target object's historical interactive behavior and real-time interactive behavior, a search keyword, a reordering trigger condition type, and a real-time interactive behavior. Therefore, based on this, a degree of interest of the target object in each to-be-sorted media content is measured, to obtain a score of each to-be-sorted media content.

Specifically, the reordering and scoring in embodiments of this application may be divided into two parts, including a training part and an application part. The training part relates to the technical field of the machine learning. The artificial neural network model (that is, the reordering model mentioned later) is trained by using the machine learning, so that the artificial neural network model is trained based on training sample data given in embodiments of this application such as the historical interactive behavior and the real-time interactive behavior, the search keyword, and the reordering trigger condition type. In addition, a model parameter is continuously adjusted by using an optimization algorithm until the model converges. In the application part, the artificial neural network model obtained by training in the training part is used to score each to-be-sorted media content when reordering is triggered during actual use, to reorder each to-be-sorted media content.

In addition, the artificial neural network model in embodiments of this application may be trained online or offline. This is not specifically limited herein. In this specification, offline training is used as an example.

In related art, after a search result is returned to a client, an order of short videos in a sequence is established. Regardless of what interactive behavior the target object performs during this search session, a relative order of short videos may not change. As a result, the target object may need to spend more time to find a needed short video. In addition, when the search result page displays too many short videos that are inconsistent with the search intention of the target object, the target object may quickly exit the search session, which also reflects poor user experience of the short video platform.

Similarly, in addition to the short videos, search for other form of media contents also has the above mentioned problems.

In an actual search process, the target object usually generates a large quantity of interactive behaviors for the displayed search result page, such as liking, commenting, and page turning. These interactive behaviors include a variety of positive feedbacks and negative feedbacks. These feedbacks may reflect the intention and preference of the target object. However, in related art, an impact brought by these interactive behaviors is not taken into account, so an order of the searched content sequence cannot be changed during a search process, and a search intention of a user cannot be satisfied in a timely manner.

Based on this, embodiments of this application provide a search result reordering method. In this method, after a search result page corresponding to a search session is displayed, during a continuing process of the search session, at least one real-time interactive behavior performed by a target object on the search result page may be recorded. When the at least one real-time interactive behavior satisfies a reordering trigger condition, the search result page is updated, and an originally displayed first content sequence is updated to a second content sequence. The second content sequence is obtained by reordering to-be-sorted media contents that are not associated with the at least one real-time interactive behavior in the first content sequence. In this way, during a search session, a real-time interactive behavior represents an instant interest of the target object, thereby adjusting an order of media contents in a search result based on the instant interest, accuracy of result presentation of this search session is improved and a search intention of the user is satisfied in a timely manner, thereby improving content search efficiency, and timeliness of feedback on an interactive behavior of the target object is also improved.

In addition, in embodiments of this application, a real-time interactive behavior of the target object is recorded, and a decision on whether to trigger reordering is comprehensively and intelligently made by combining a condition of a current device and a historical interactive behavior of the target object, so as to improve accuracy of triggering timing of reordering, which is more in line with a usage requirement of the target object.

In terms of reordering, embodiments of this application provide a reordering model that can take into account short-term and long-term interests of a target object for reordering of media contents, to improve accuracy of a content sequence obtained by reordering, and can also help the target object to find a needed media content more quickly and satisfy a search intention of a user in a timely manner.

The following is a brief description to an application scenario applicable to the technical solutions of embodiments of this application. The application scenario described below is merely intended to describe embodiments of this application, but is not intended to limit this application. During a specific implementation process, the technical solutions provided in embodiments of this application may be flexibly applied according to an actual requirement.

The solutions provided in embodiments of this application may be suitable for most content search scenarios, such as a short video search scenario. FIG. 1 is a schematic diagram of an application scenario according to an embodiment of this application. In this scenario, a terminal device 101 and a server 102 may be included.

The terminal device 101 may be, for example, a mobile phone, a tablet computer (PAD), a notebook computer, a desktop computer, a smart TV, a smart vehicle-mounted device, a smart wearable device, or any other device capable of presenting and searching a media content. A target application may be installed in the terminal device 101. The target application has a function of searching and presenting a media content. For example, the target application may be an instant messaging application, a music application, a video application, a short video application, a news application, and a shopping application. An application involved in embodiments of this application may be a software client, or a client such as a web page or an applet.

The server 102 is a server corresponding to software, the web page, the applet, and the like. A specific type of the client is not limited. The server 102 may be, for example, an independent physical server, a server cluster or a distributed system composed of a plurality of physical servers, or a cloud server that provides a basic cloud computing service such as a cloud service, a cloud database, cloud computing, a cloud function, cloud storage, a network service, a cloud communication, a middleware service, a domain name service, a security service, a content delivery network (CDN), and a big data and artificial intelligence platform, but is not limited thereto.

The search result reordering method in embodiments of this application may be performed by the terminal device 101 alone, or may be performed by the server 102 and the terminal device 101 jointly. For example, after the terminal device 101 displays a search result page corresponding to a search session, during a continuing process of the search session, at least one real-time interactive behavior performed by a target object on the search result page may be recorded. When the at least one real-time interactive behavior satisfies a reordering trigger condition, a second content sequence is obtained to update the search result page. An originally displayed first content sequence is updated to the second content sequence. In other words, a reordering process is performed in the terminal device 101.

Alternatively, when the terminal device 101 determines that at least one real-time interactive behavior satisfies a reordering trigger condition, a reordering request is triggered to the server 102. The server 102 performs reordering to obtain a second content sequence. Then, the terminal device 101 updates the search result page based on the second content sequence. This is not specifically limited in this application. The following mainly uses joint execution of the server 102 and the terminal device 101 as an example.

The joint execution of the server 102 and the terminal device 101 is used as an example. The server 102 and the terminal device 101 may each include at least one processor, a memory, an interactive I/O interface, and the like. In addition, the server 102 may also configure a database for storing historical interactive behavior data of the target object, a model parameter obtained by training, and the like. Memories of the server 102 and the terminal device 101 may also store program instructions that are needed to be executed by the server 102 and the terminal device 101 in the search result reordering method provided in embodiments of this application. The program instructions, when executed by the processor, may be used for implementing a search result reordering process provided in embodiments of this application. For example, the terminal device 101 may store program instructions for the related processes of displaying a search result page, determining whether a reordering trigger condition is satisfied, and updating the search result page, so that the processor of the terminal device 101 executes the program instructions to implement the processes. The server 102 may store program instructions of a reordering process, so that the processor of the server 102 executes the program instructions to implement the reordering process.

In a possible implementation, the method of embodiments of this application may be applied to a short video search scenario. Because determination of timing of reordering and the reordering process involve interactive behavior data of the target object, to implement reordering of search results for the target object, the target object may be requested to authorize collection permission and use permission of data related to the reordering in the short video platform, such as real-time interactive behavior data and historical interactive behavior data. With the permission of the target object, when the related data is obtained and it is determined that the timing of reordering is satisfied, the related data is inputted into the reordering model provided in embodiments of this application to predict a degree of interest of the target object in each to-be-sorted media content, and based on this, each to-be-sorted media content is reordered and then presented to the target object, to effectively improve accuracy of result presentation of this search session and satisfy a search intention of a user in a timely manner, thereby improving content search efficiency, and also improving timeliness of feedback on an interactive behavior of the target object.

An implementation process of the method in other search scenarios is similar to that of the foregoing short video search scenario. Therefore, details are not described herein again.

In embodiments of this application, a direct or indirect communication connection may be performed between the terminal device 101 and the server 102 via one or more networks 103. The network 103 may be a wired network or a wireless network. For example, the wireless network may be a mobile cellular network or a wireless-fidelity (Wi-Fi) network, and certainly, may alternatively be another possible network. This is not limited in embodiments of this application.

FIG. 1 is only an example. The number of terminal devices and servers is not limited actually. This is not specifically limited in embodiments of this application.

Figure 2:
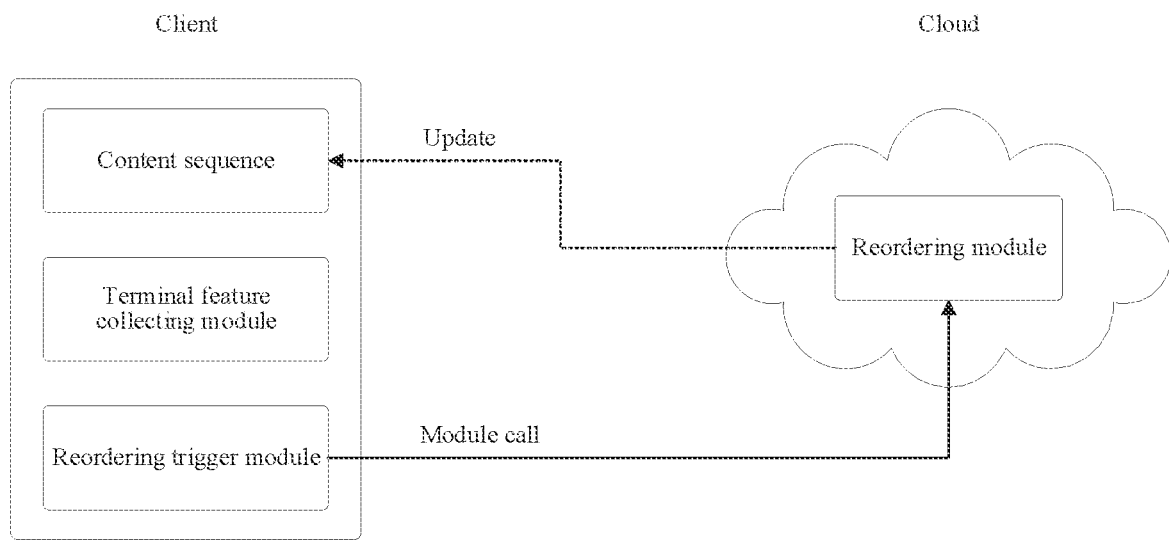
FIG. 2 is an architectural diagram of a media content search system according to an embodiment of this application.

FIG. 2 is an architectural diagram of a media content search system according to an embodiment of this application. In the architecture, a client part and a cloud part are included. The client part includes a terminal feature collecting module and a reordering trigger module, and the cloud part may include a reordering module. When steps of the foregoing method of embodiments of this application are performed by the terminal device 101, then each of the modules is deployed on the terminal device 101. When steps of the foregoing method of embodiments of this application are jointly performed by the terminal device 101 and the server 102, then the terminal feature collecting module and the reordering trigger module may be deployed in the terminal device 101, and the reordering module may be deployed in the server 102, and FIG. 2 specifically shows this as an example.

After a client presents a corresponding search result page based on a content sequence, the terminal feature collecting module generates and continuously maintains a corresponding terminal feature for each media content in the search result page based on a real-time interactive situation of a target object. The terminal feature is used as an input feature to assist in intelligence-triggered decision-making and reordering. The reordering trigger module determines whether reordering is needed to be triggered for a current state based on the collected terminal feature. When the reordering is selected, a module call is initiated to the reordering module in a cloud. The reordering module performs reordering on to-be-sorted media contents based on current interaction context, the current terminal feature, a current historical interactive behavior, and the like, and returns the to-be-sorted media contents to the client to update the content sequence, to achieve an effect of updating the search result page.

The search result reordering method provided in the exemplary implementations of this application is described below in combination with the above-described application scenario and the accompanying drawings. The above application scenario is only shown to facilitate understanding the spirit and principles of this application. The implementations of this application are not limited in this aspect.

Figure 3:
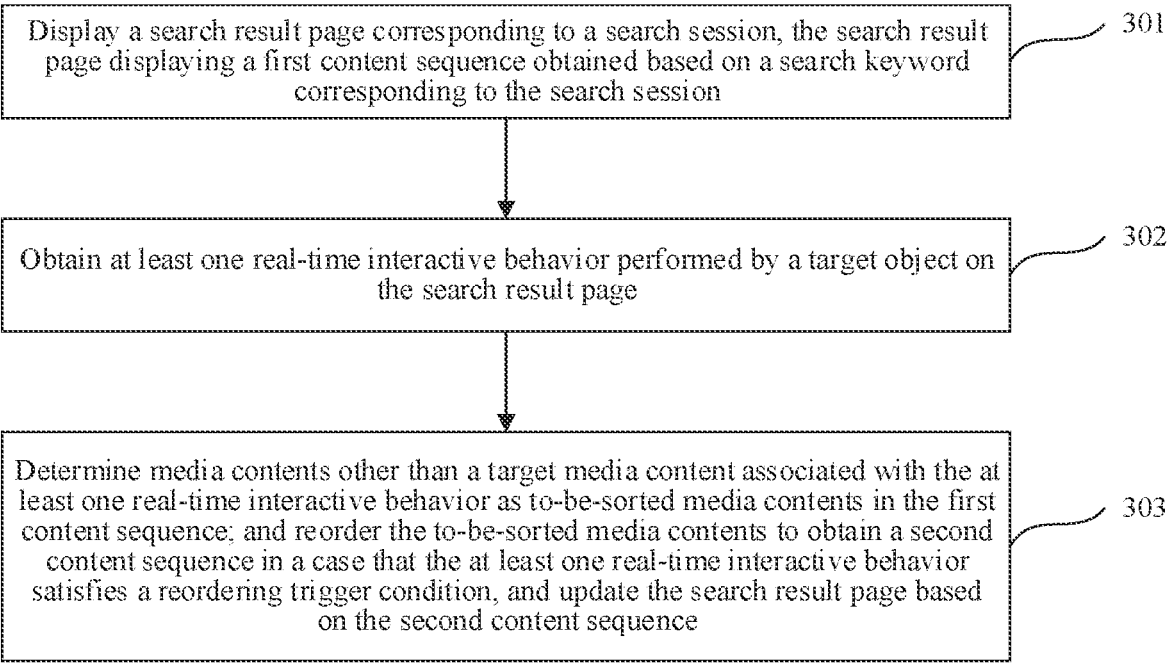
FIG. 3 is a schematic flowchart of a search result reordering method according to an embodiment of this application.

FIG. 3 is a schematic flowchart of a search result reordering method according to an embodiment of this application. A specific implementation process of the method is as follows:

Step 301: Display a search result page corresponding to a search session, the search result page displaying a first content sequence obtained based on a search keyword corresponding to the search session, and the first content sequence including a plurality of media contents.

In embodiments of this application, when a target object wants to search for some media contents in a client, the target object may enter the search keyword in a search interface provided by the client to trigger the search session. For example, after the target object enters the search keyword in a search box and confirms a search, the search session starts, and then the client initiates a search request to a cloud. Based on the search keyword of the target object, in combination with a preference of the target object and other information, by using stages such as recalling (that refers to placing a media content that satisfies a basic condition in a candidate queue for the search request), rough sorting (that is, rough sorting performed based on basic information of the media content), precise sorting (that is, precise sorting performed based on all information of the media content), and hybrid sorting, the cloud obtains a first content sequence for the search keyword, and returns the first content sequence to the client to present the first content sequence to the target object.

The first content sequence may be a mixture of multiple forms of media contents, or a single form of media content. The form here mainly refers to a carrying method of media content information, such as a video, an audio, a text, and an image. A specific content sequence may be set according to actual requirements of the client.

Figure 4A:
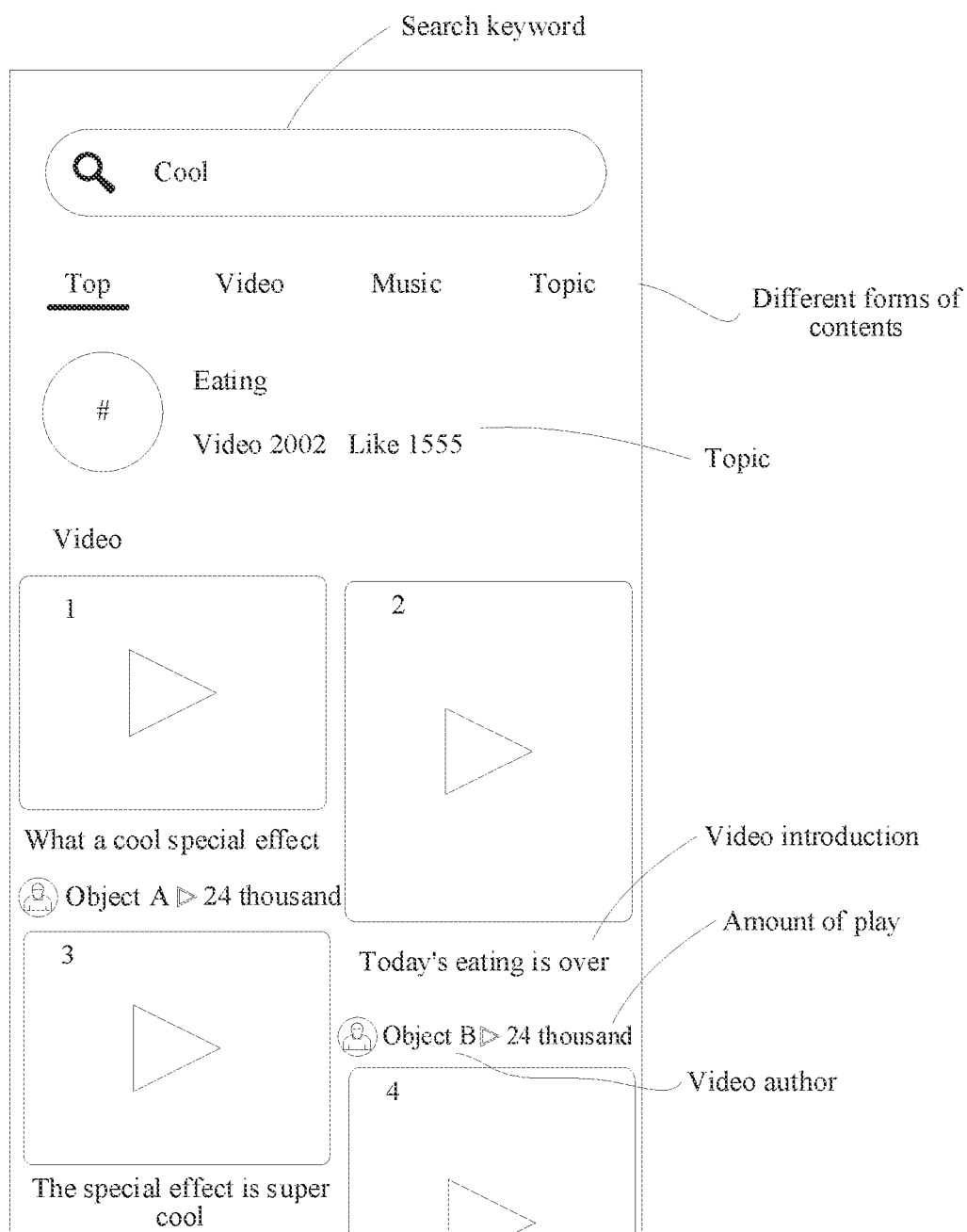
FIG. 4A to FIG. 4D are schematic diagrams of client presentation pages according to an embodiment of this application.

FIG. 4A is a schematic diagram of a search result page presented by the client. After receiving the first content sequence, the client displays a corresponding media content to the target object in the search result page. In general, when displayed in the search result page, the media content may be displayed separately based on different content forms. For example, a video and an audio are displayed in different areas. Alternatively, the media contents may be displayed in order according to the priority of the media contents. For example, a topic content may be displayed first, such as a topic "amazing" in FIG. 4A. Alternatively, the media contents may be displayed in order according to scores in the precise sorting or hybrid sorting stage. For example, sorting scores of videos 1 to 4 in FIG. 4A decrease in order.

In practical applications, there are many manners to display the first content sequence in the search result page. One is to completely display all contents included in the first content sequence, and the other is to display only some contents of the first content sequence. Refer to FIG. 4A, the first content sequence is displayed in the search result page in a manner of a dual-column video stream. However, due to the limited size of a display area, only a small number of videos can be accommodated. Currently, only videos 1 to 4 are accommodated, and the remaining videos may be displayed gradually in the form of a sliding window or a drop-down box.

When the media content is displayed, information related to the media content may be displayed. Short videos are used as an example. Information such as covers, introductions, video authors (that is, copyright owners of the videos, content provider (CP)), and the amount of views of the short videos may be displayed.

Step 302: Obtain at least one real-time interactive behavior performed by the target object on the search result page.

In embodiments of this application, the search result page may include a main search result page and a sub-result page corresponding to each media content in the main page.

Therefore, an interactive behavior performed on the main search result page and each sub-result page may be included in the at least one real-time interactive behavior performed on the search result page.

Specifically, during a continuing process of a search session, the target object may perform an interactive behavior on the search result page to find a wanted media content. During this process, any interactive behavior of the target object may be obtained and used as a data basis for subsequent reordering triggering.

Figure 4B:
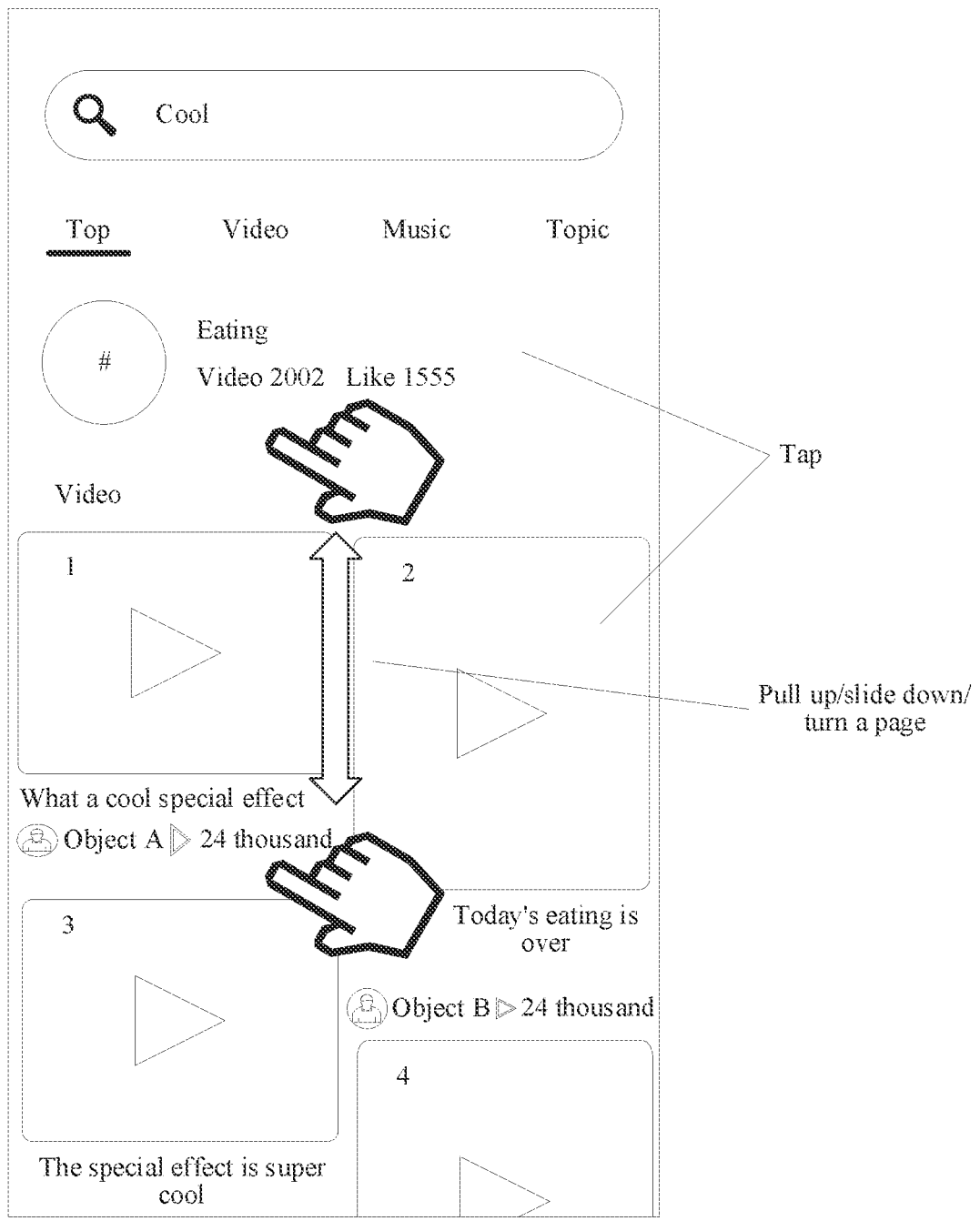

The real-time interactive behavior may include the following behaviors:

1. The following behaviors performed on the main search result page:

(1) A behavior of triggering display of a sub-result page corresponding to a target media content, such as taping on the target media content. Refer to FIG. 4B, the behavior of triggering display of the sub-result page may include a behavior of taping on a topic or a video to display a corresponding sub-result page.

(2) A behavior of toggle display of a media content on the main search result page. Refer to FIG. 4B, this may include a behavior such as pulling up, sliding down, sliding left, sliding right, and page turning on the main search result page.

Figure 4C:
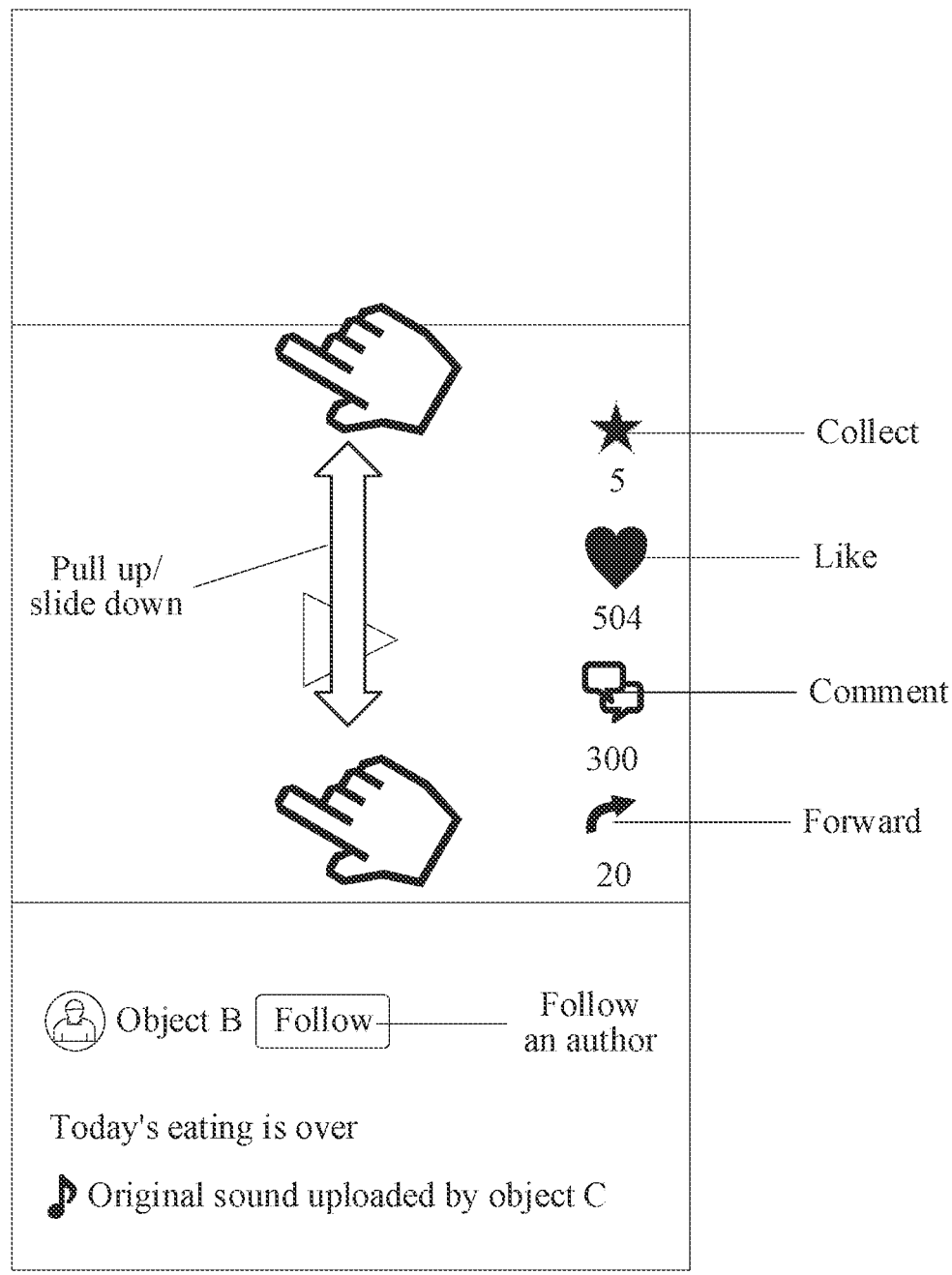

2. Refer to FIG. 4C, the following behaviors performed on the sub-result page.

(1) Adding a current media content into a favorite of the target object.

(2) Liking the current media content.

(3) Commenting the current media content.

(4) Forwarding the current media content.

(5) Following an author corresponding to the current media content.

(6) Performing a media content switching operation on the sub-result page, such as pulling up, sliding down, sliding left, and sliding right.

(7) Other no-operation behaviors. For example, a user does not stay on the current sub-result page for more than 3s. This behavior may be referred to as a quick slashing behavior. When a playback completion ratio of a video on the current sub-result page exceeds a certain ratio threshold, this behavior may be referred to as a high playback completion behavior.

Step 303: Determine media contents other than a target media content associated with the at least one real-time interactive behavior as to-be-sorted media contents in the first content sequence; and reorder the to-be-sorted media contents to obtain a second content sequence when the at least one real-time interactive behavior satisfies a reordering trigger condition, and update the search result page based on the second content sequence.

In embodiments of this application, it is considered that when a server generates the first content sequence, in addition to the current search keyword, the server may also refer to a preference of the target object and other data for comprehensive consideration. The first content sequence obtained in this way has a certain degree of accuracy. However, preference data mainly represents a long-term interest of the user, while the real-time interactive behavior performed by the target object on this search session represents a short-term interest of the target object, and can better reflect a search intention of the target object in the search session. These interactive behaviors need to be considered.

Therefore, in embodiments of this application, it is intelligently determined whether reordering needs to be triggered by using the real-time interactive behavior performed by the target object during the continuing process of the search session. When the reordering needs to be triggered, media contents that are not associated with the at least one real-time interactive behavior in the first content sequence are reordered to obtain a second content sequence, and the search result page is updated based on the second content sequence.

Reordering triggered by a tap-to-play behavior is used as an example. When the target object taps to play video 2 and it is determined that the reordering trigger condition is satisfied, a sub-result page corresponding to video 2 is entered. When the target object returns to the search result page from the sub-result page, an updated search result page may be displayed.

Figure 4D:
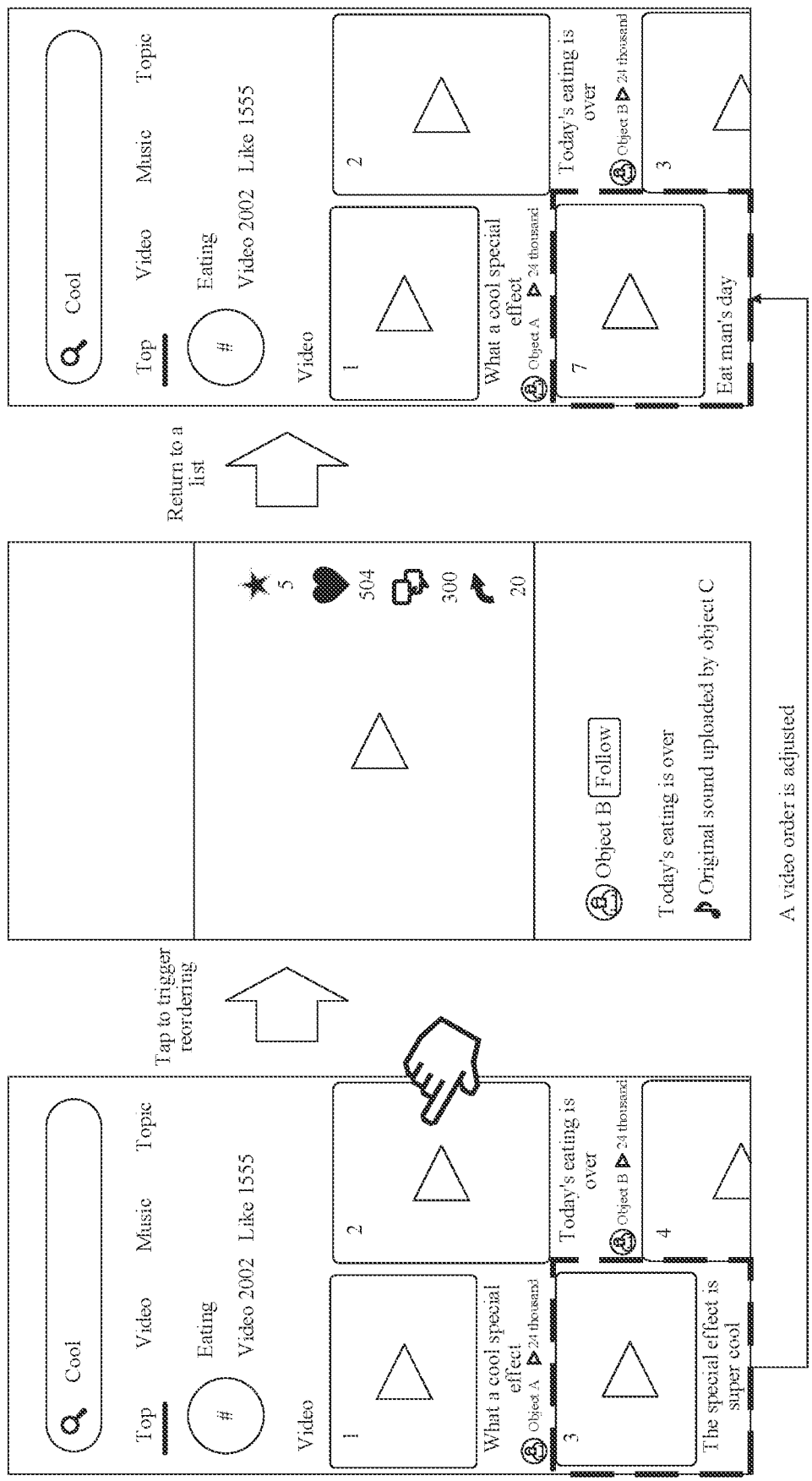

Refer to FIG. 4D, in an original search result page, videos are displayed in an order of numbers 1 to 4. To be specific, a next video of video 2 in a video list is video 3 having different content from the current video 2. Therefore, during a process in which the target object taps on video 2 to browse, reordering for the search result is triggered. When the target object finishes browsing of video 2 and returns to the search result page, the updated search result page may be displayed. As shown in FIG. 4D, the next video of video 2, namely video 3, is replaced with video 7 that is more relevant to video 2, the original video 3 is moved to a next position.

The video is used as an example, and the same is true for other forms of media contents. Therefore, other forms of media contents are not described herein again.

Triggering preloading of page turning on the search result page is used as an example. When the first content sequence includes more media contents that cannot be displayed in full in the search result page, the media contents may be displayed in pages. When one page is displayed, the target object may trigger the page turning in a certain manner. That the target object browses a previous media content and wants to turn a page indicates that the target object is not interested in the media content on the previous page. In this case, the reordering is triggered, and subsequent media contents may be reordered, and subsequently displayed page may be displayed in a new order. For example, in the first content sequence, a video sequence of a next page is videos 5→6→7→8. After reordering, a video sequence in the second content sequence may change to 8→6→9→7. However, because the foregoing video sequence 5→6→7→8 is not displayed, this change is therefore essentially imperceptible to the target object.

When reordering is triggered based on another trigger condition type, a process is similar to the foregoing process.

Therefore, adjusting the search result of the media content based on an intention of the user facilitates improving accuracy of result presentation of this search session and satisfies a search intention of the user in a timely manner, thereby improving content search efficiency, and also improving timeliness of feedback on an interactive behavior of the target object.

In embodiments of this application, whether to trigger reordering and that the reordering process requires a data basis are considered. During the continuing process of the search session, extraction of a terminal feature may also be performed on each media content in the first content sequence. The extraction of the terminal feature may be performed on all media contents in the first content sequence, or on some media contents in the first content sequence. For example, it is considered that the terminal feature mainly comes from a series of operations generated in the interactive behavior of the target object. Therefore, an object on which the extraction of the terminal feature is performed is mainly a media content that the target object has browsed, such as a media content that is exposed to the target object.

In embodiments of this application, the terminal feature of each media content may be collected and maintained by using the terminal feature collecting module shown in FIG. 2. Specifically, the terminal feature collecting module may extract, based on real-time interactive behavior data of the at least one real-time interactive behavior during the continuing process of the search session and historical interactive behavior data of the target object, a terminal feature corresponding to each target media content. The terminal feature is generated during a process in which the target object browses the media content, and can express an interactive tendency of the target object for this search session.

Figure 5:
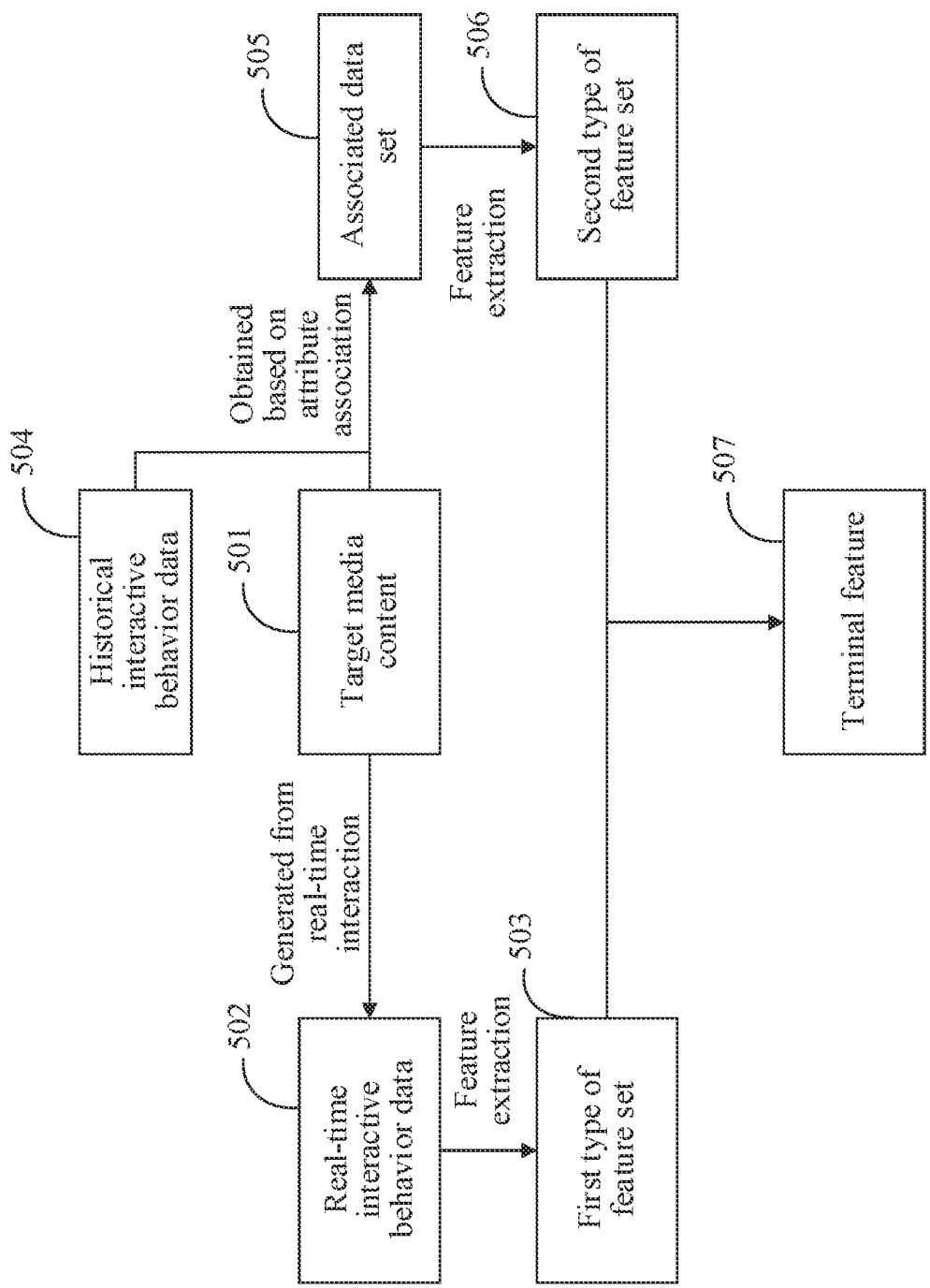
FIG. 5 is a schematic diagram of an extraction process of a terminal feature according to an embodiment of this application.

According to a type of interactive behavior, the terminal feature may include a first type of feature set and a second type of feature set. Furthermore, refer to FIG. 5. The extraction of the terminal feature may be implemented as the following processes:

The at least one real-time interactive behavior during the continuing process of the search session may directly reflect an interest of the target object in this search session. Therefore, a first type of feature set 503 of each target media content 501, also referred to as a direct feature, can be extracted from real-time interactive behavior data 502 generated from these real-time interactive behaviors.

For example, the real-time interactive behavior is an interactive behavior performed on the current media content, and the historical interactive behavior is an interactive behavior performed on other browsed media contents before the current media content in this search session.

Figure 6:
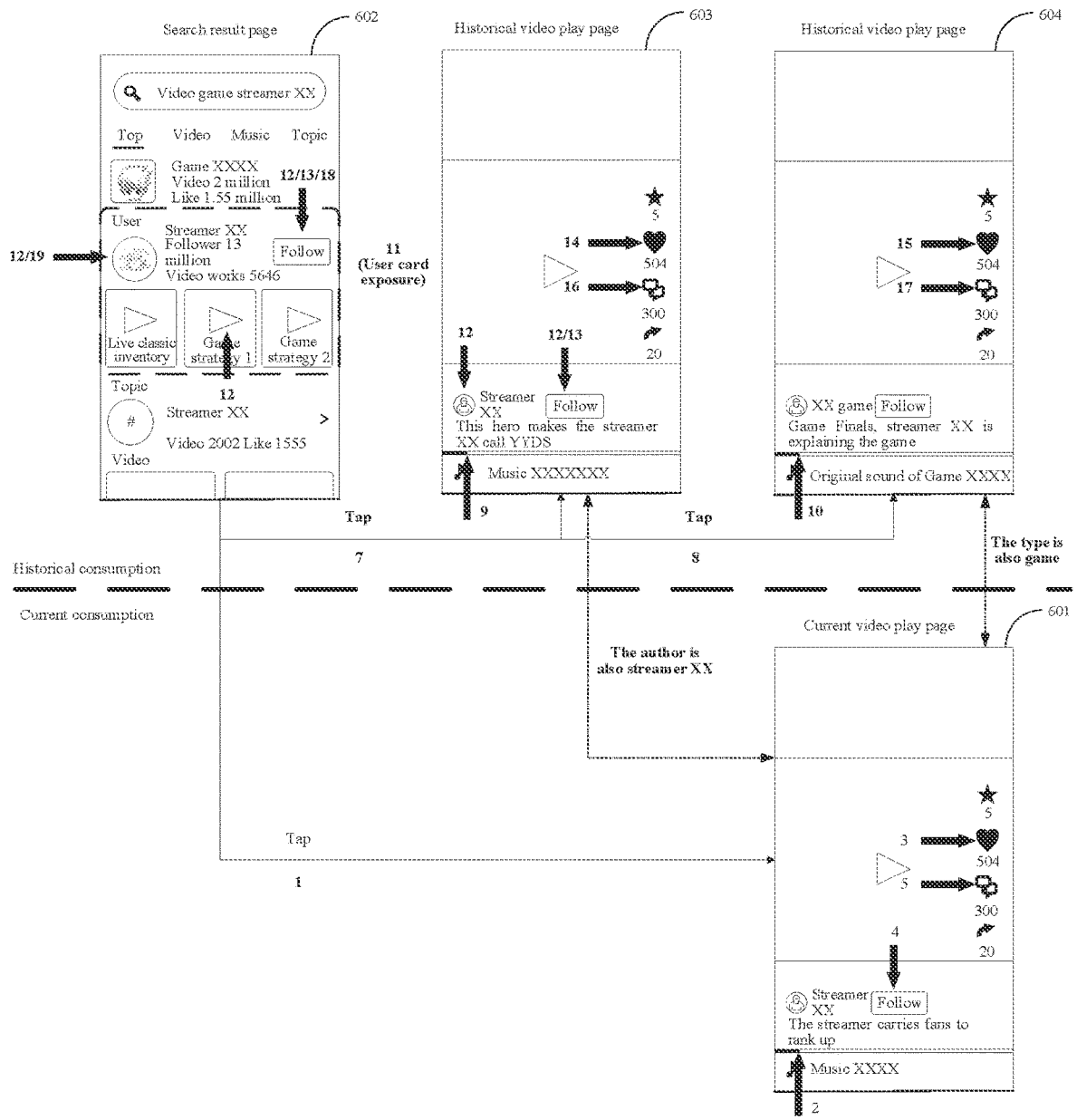
FIG. 6 is a schematic diagram of interaction corresponding to a terminal feature according to an embodiment of this application.

The direct feature is obtained from a browsing behavior of the target object on the current page. FIG. 6 is a schematic interactive diagram corresponding to a terminal feature. Refer to a lower part of the interactive diagram. All operations of the target object such as liking, commenting, following, and playing a progress in a play page 601 (that is, the sub-result page) generate the direct feature to describe a browsing state of a current video. Based on the browsing state, it is directly determined whether the target object is interested in the current video, and in a reordering process, the browsing state may be used as an important input feature.

Table 1 is a list of features included in direct features provided in embodiments of this application, and may include the following features:

TABLE 1

| Feature name | Feature ID | Feature meaning |
| --- | --- | --- |
| is_cur_play | 0 | Is it a currently played video (0/1) |
| is_click | 1 | Is a result page tapped (0/1) |
| is_quickSlash | 2 | Is a play page quick-slashed (0/1) |
| is_dianZan | 3 | Is the play page liked (0/1) |
| is_guanZhu | 4 | Is the play page followed (0/1) |
| is_comment | 5 | Is the play page commented (0/1) |
| complete_rate | 6 | Playback completion degree of the play page (a floating point value with a playback completion ratio between 0 to 1) |

The feature IDs in Table 1 correspond to IDs identified in FIG. 6. Video is used as an example. Refer to FIG. 6, for a video, a feature ID of 0 indicates whether the video is a currently played video. When the video is the currently played video, a corresponding feature value is 1, otherwise a feature value is 0. A feature ID of 1 indicates whether the video is tapped on a search result page 602. When the video is tapped, a feature value is 1, otherwise a feature value is 0, and so on for other features.

Refer to FIG. 6, when the target object performs a certain real-time interactive behavior, a terminal feature corresponding to a targeted media content may be updated. For example, when video 1 is tapped in FIG. 6, feature 0 of video 1 is updated to 1, and feature 1 is updated to 1.

In embodiments of this application, it is also considered that in addition to the real-time interactive behavior, the historical interactive behavior also reflects the interest of the target object. Therefore, historical interactive behavior data 504 may also be combined to maintain the terminal feature of each media content. Specifically, for each media content, an associated data set 505 of each target media content may be determined from the historical interactive behavior data 504. The associated data set 505 of each target media content includes historical interactive behavior data 504 corresponding to a media content having a same attribute as the associated data set 505. The same attribute may include, for example, the same author of media contents and the same type of media contents (where a first-level category of a video is used as an example, and for example, both videos are game videos), and may also include another same attribute. This is not limited in embodiments of this application.

Furthermore, based on each obtained associated data set 505, a second type of feature set 506 of each target media content is extracted, also referred to as a generalization feature, so that based on each obtained first type of feature set and second type of feature set, a terminal feature 507 of each target media content is obtained.

Therefore, the generalization feature is obtained by associating a behavior generated during a historical browsing process of the target object with a current video.

Because in the direct features, in addition to a playback completion degree that is needed for every video, another part of behavior is relatively sparse (where based on a statistical conclusion, a proportion is about 10%), meaning that a vast majority of direct features may be 0 and less information can be provided. Therefore, a certain degree of generalization for the direct features may be considered to increase coverage of features.

It is considered that in a short video scenario, the CP and the first-level category of the video (abbreviated as cate1) are two important attributes for short videos. The two attributes may be selected for generalization. Other attributes are also available.

Cate1 is used as an example to explain a specific generalization process. Refer to FIG. 6, in an upper half part of a dotted line in the interactive diagram, the target object browses a game video in the past and a liking behavior is generated. Then when the target object browses another video in a game category, a generalization feature corresponding to the video may be set to 1. Similarly, a similar generalization operation is also performed on a behavior such as following or commenting. A generalization method for the CP is similar to cate1.

In embodiments of this application, a terminal feature platform may be developed in a targeted manner, is responsible for providing a series of feature extraction interfaces, but is not responsible for specific implementation of feature logic. In an actual application process, a feature extraction function may be quickly implemented by using a script delivery method according to requirements, thereby improving development and maintenance efficiency.

Table 2 is a list of features included in generalization features provided in embodiments of this application, and may include the following features:

TABLE 2

| Feature name | Feature ID | Feature meaning |
| --- | --- | --- |
| is_cp_click | 7 | Is a CP corresponding to the feed in a result page tapped (0/1) |
| is_cate1_click | 8 | Is cate 1 corresponding to the feed in the result page tapped (0/1) |
| is_cp_quickSlash | 9 | Is a video belonging to the CP of the feed in a play page quick-slashed (0/1) |
| is_cate1_quickSlash | 10 | Is a video belonging to the catel of the feed in the play page quick-slashed (0/1) |
| is_cp_userCard | 11 | Does a user card of the CP corresponding to the feed in the result page appear |
| is_cp_userCard_clk | 12 | Condition 1: Whether the user card of the CP corresponding to the feed in the result page is tapped includes any of the following three situations: (1) Entering a user homepage (poster.N) (2) Following (poster.focus.N) (3) Tapping on a video linked to the user card (poster.video.N) Condition 2: Whether the CP corresponding to the feed in the play page is tapped includes the following situation: (1) Tapping on an avatar on the play page to enter the user homepage |
| is_cp_guanZhu | 13 | Is the CP of the feed followed in a current session (0/1) |
| is_cp_dianZan | 14 | Is the video belonging to the CP of the feed in the play page liked (0/1) |
| is_cate 1_dianZan | 15 | Is the video belonging to catel of the feed in the play page liked (0/1) |
| is_cp_comment | 16 | Is the video belonging to the CP of the feed in the play page commented (0/1) |
| is_catel_comment | 17 | Is the video belonging to catel of the feed in the play page commented (0/1) |
| is_cp_result_guanZhu | 18 | Is the CP in a search result page followed (0/1) |
| is_cp_result_click | 19 | Is the user card in the search result page tapped (0/1) |
| first_played_time | 20 | Timestamp when the video is first played (used for restoring a playback order) |

Refer to FIG. 6, similar to Table 1, the feature IDs in Table 2 also correspond to IDs identified in FIG. 6.

A video is used as an example. In Table 2, the feed represents a video, the CP represents an author, cate1 represents a first-level category of the video, the result page represents a main search result page, and the play page refers to a video play page.

Refer to FIG. 6, for a video, a feature ID of 7 indicates whether an author corresponding to the video in a search result page is tapped. When the author is tapped, a corresponding feature value is 1, otherwise a feature value is 0. A feature ID of 8 indicates whether a video of the same type corresponding to the video in the search result page is tapped. When the video is tapped, a feature value is 1, otherwise a feature value is 0, and so on for other features.

As can be seen, Table 1 and Table 2 cover a total of 21 dimensions of terminal features, including the direct features generated from the interactive behaviors on the current video and the generalization features obtained by generalizing the interactive behaviors on other videos to the current video based on some dimensions (such as the first/second-level category and the video author). After design and processing of the generalization features, coverage of the terminal feature is effectively increased to about 40%, greatly improving efficiency of use of a feature.

With the data basis, whether reordering needs to be triggered during the search session can be intelligently determined. In embodiments of this application, determination of whether to trigger reordering can be performed by the reordering trigger module shown in FIG. 2. The reordering trigger module determines whether reordering needs to be triggered at a current moment based on a real-time interactive behavior of the target object in a current search session.

In a possible implementation, it can be determined whether the real-time interactive behavior satisfies the reordering trigger condition. When the reordering trigger condition is satisfied, reordering is triggered.

In practical applications, two aspects need to be considered for design of the reordering trigger condition:

According to one aspect, triggering reordering under the reordering trigger conditions has practical significance.

In general, when the target object shows a significant positive or negative interactive behavior, it is necessary to adjust a subsequent content sequence in a timely manner. In this way, for the positive interactive behavior, a browsing time length may be extended to help the target object find a content the target object wants to watch, and for the negative interaction behavior, a potential interest of the target object may be explored in a timely manner to prevent the target object from quickly exiting the current search session.

According to another aspect, trigger frequency caused by the reordering trigger condition also needs to be considered.

Because of the triggering of reordering, there is a certain amount of computing consumption, regardless of whether the reordering process is performed by the cloud or by the client. Especially for terminal reordering, computing capabilities of different models vary greatly, and too frequent reordering may affect user experience. When the trigger conditions are too strict, reordering coverage may be insufficient, making it difficult to achieve a service goal.

Based on the foregoing considerations, in embodiments of this application, the following reordering trigger conditions are designed, and each reordering trigger condition corresponds to one trigger condition type. In this way, when the real-time interactive behavior satisfies the reordering trigger conditions, the search result page is updated, including:

(1) Triggering display of a sub-result page corresponding to the target media content in the search result page.

In other words, when the target object operates a specific target media content in the search result page and enters a corresponding sub-result page to view details of the target media content, it indicates that the target object currently has a strong interest in the target media content, reflecting a current interest of the target object. Therefore, an order of a media content with little relevance to the target media content is moved back, and an order of media content with greater relevance to the target media content is moved forward.

A specific operation of "triggering display" is tap-to-play. The user taps on a certain video on the sub-result page to start watching. Therefore, a trigger condition type corresponding to the reordering trigger condition may be "tap-to-play".

(2) Triggering toggle display of another media content outside the first content sequence in the search result page.

Such behavior may include triggering preloading of page turning on the search result page and other behaviors. For example, the user drops down a screen on the search result page, to trigger the preloading of page turning. When the target object performs such behaviors, it is usually indicates that the target object is not satisfied with a currently displayed media content, so adjusting an order of the entire media content needs to be triggered in a timely manner. A trigger condition type corresponding to the reordering trigger condition may be "search page turning".

(3) Performing positive interaction on the sub-result page, the positive interaction representing a behavior that the target object is interested in a corresponding media content.

Such behavior may include following, forwarding, sharing, commenting, liking, a high playback completion behavior, and the like on the sub-result page. The high playback completion behavior is that a degree of browsing completion of a media content exceeds a threshold. The threshold may be set as needed. For example, for a video, the threshold may be set according to a time length of the video.

A trigger condition type corresponding to the reordering trigger condition may be "positive interaction".

(4) Performing negative interaction on the sub-result page, the negative interaction representing a behavior that the target object is not interested in a corresponding media content.

Such behavior may include the triggering preloading of page turning and a continuous quick slashing behavior. Such behavior indicates that the target object is not interested in the currently displayed media content. The continuous quick slashing behavior is that the target object stays on M consecutive sub-result pages for less than N seconds. In one implementation, M may be set to 2 and N to 3.

A trigger condition type corresponding to the reordering trigger condition may be "negative interaction".

(5) Returning to the search result page from the sub-result page.

Similarly, such behavior also indicates that the target object is not interested in the currently displayed media content. A trigger condition type corresponding to the reordering trigger condition may be "returning".

In the foregoing reordering trigger conditions, each behavior can strongly guarantee a current interest tendency of the target object. For example, the foregoing tap-to-play, positive interaction, or high playback completion behavior are all positive feedback behaviors of the user, and the continuous quick slashing and the returning are negative feedback behaviors. Different trigger condition types may flexibly describe intention and state changes of the target object during the search session, thereby providing a beneficial signal and data basis for subsequent reordering work.

In another possible implementation, in actual applications, a model may alternatively be used for replacing the foregoing logic triggered based on determining whether the condition is satisfied. In other words, a reordering trigger prediction model is trained based on training data. The training data includes interactive behavior data of the user within a period of time and load and network states of a terminal device used. Then, it may be comprehensively determined, based on various factors such as currently browsed context, historical browsing, a current network environment, and a mobile phone load of the current user, whether to trigger reordering to achieve a higher level of intelligent decision-making.

Specifically, reordering trigger prediction data is obtained and the reordering trigger prediction data is inputted into a trained reordering trigger prediction model to obtain a prediction result indicating whether to trigger reordering. When the prediction result indicates to trigger reordering, reordering is performed and the search result page is updated.

The reordering trigger prediction data may include one piece or a combination of the following data:

(1) real-time interactive behavior data of the real-time interactive behavior, (2) historical interactive behavior data of the target object, (3) current load state of the terminal device, and (4) current network state of the terminal device.

Other possible data may also be included. This is not limited in embodiments of this application.

In embodiments of this application, the reordering process may be performed by the client itself, or may be performed by the cloud in combination with rich computing resources of the cloud (server) to improve sorting efficiency.

Figure 7:
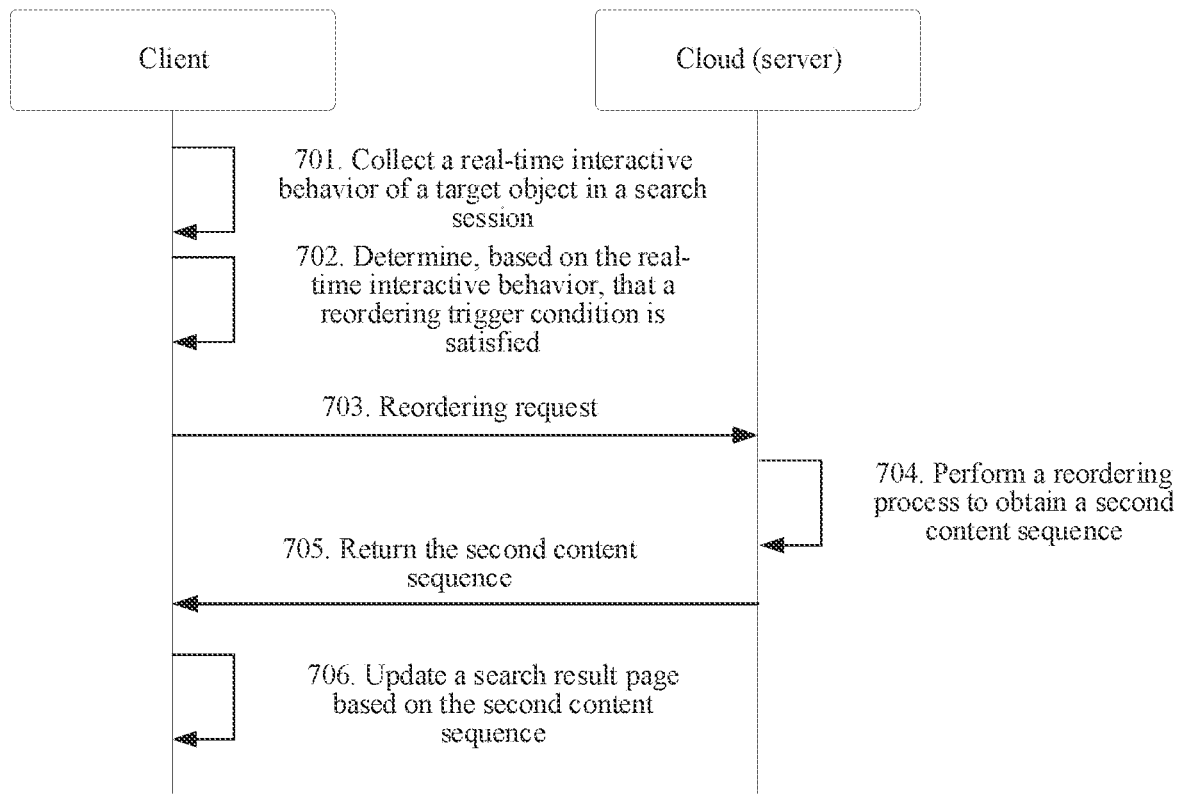
FIG. 7 is a schematic flowchart of terminal-cloud collaborative execution according to an embodiment of this application.

When the reordering process is performed by the cloud, refer to FIG. 7, which is a schematic flowchart of terminal-cloud collaborative execution according to an embodiment of this application.

Step 701: A client collects a real-time interactive behavior of a target object in a search session.

Step 702: The client determines, based on the real-time interactive behavior, that a reordering trigger condition is satisfied.

Step 703: The client initiates a reordering request to a server.

The reordering request may carry a terminal feature corresponding to a target media content, and the terminal feature is extracted based on real-time interactive behavior data of at least one real-time interactive behavior and historical interactive behavior data of the target object, that is, the direct feature and generalization feature extracted above.

Step 704: The server performs a reordering process to obtain a second content sequence.

The server establishes a reordering model based on browsed context and a historical interest of the target object, reorders videos that have not been browsed in the search result to obtain a second content sequence, and returns the second content sequence to the client. Specifically, the second content sequence may be obtained by the server using the trained reordering model based on the terminal feature.

Step 705: The server returns the second content sequence to the client.

Step 706: The client updates a search result page based on the second content sequence.

Figure 8:
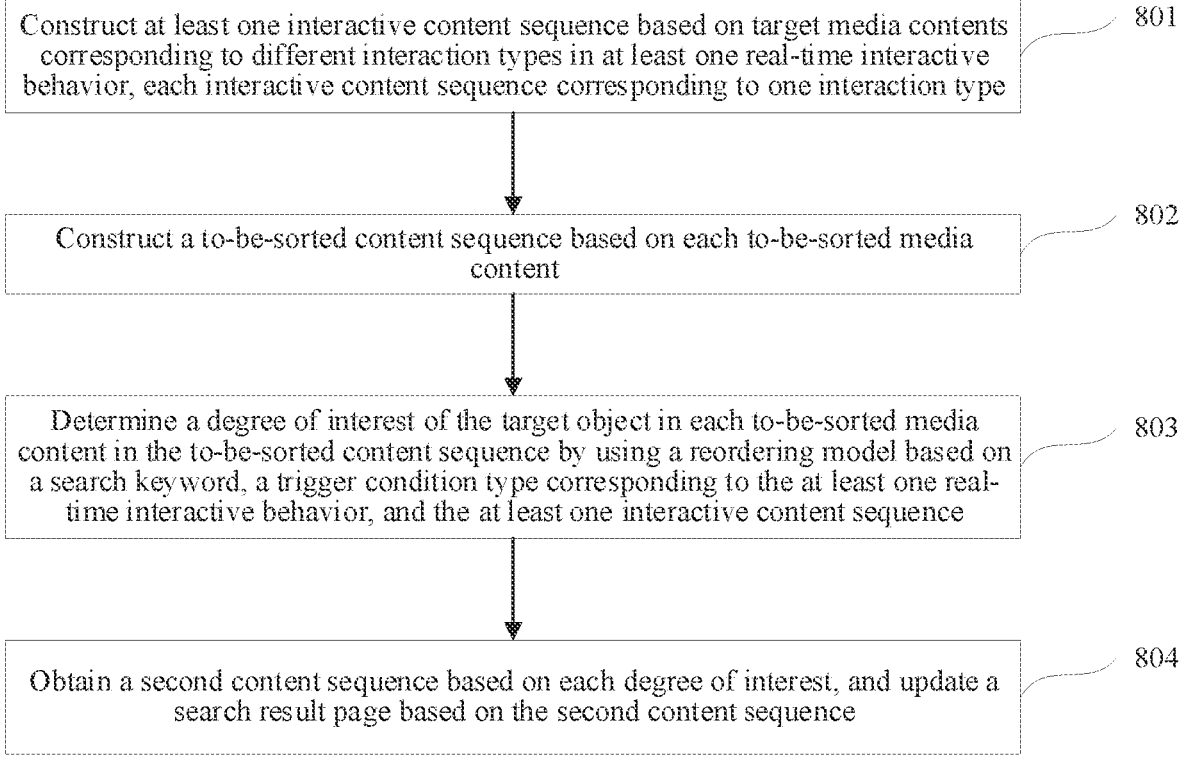
FIG. 8 is a schematic flowchart of a reordering process according to an embodiment of this application.

In embodiments of this application, the reordering process may be performed by the reordering module shown in FIG. 2. The reordering module may perform the reordering process based on the trained reordering model. FIG. 8 is a schematic flowchart of reordering according to an embodiment of this application, including the following steps:

Step 801: Construct at least one interactive content sequence based on target media contents corresponding to different interaction types in at least one real-time interactive behavior, each interactive content sequence corresponding to one interaction type.

In embodiments of this application, the interaction types may include exposure, positive interaction, negative interaction, and the like, so the following content sequences can be constructed:

(1) Exposure content sequence: It is constructed based on a target media content displayed in a search result interface. For example, the exposure content sequence may be a playback exposure sequence generated by the target object in a search session.

Browse information in the current search session reflects an intention and an interest of the target object in this search session, and is crucial to a sorting effect. Each time the target object browses a media content (for example, displaying on a result page or tapping to play by the target object), one element is added to the exposure content sequence.

In a possible implementation, the exposure content sequence maintains a window having a maximum length of M (for example, 10). Recently browsed M media contents are recorded. Each media content in the sequence may include several features: a category feature, a posterior statistical feature, a precise sorting advanced feature and a terminal feature. These features of each media content are combined into a feature vector, a sum of feature dimensions is h, and then features of the entire sequence are combined into an M*h matrix as input to the reordering model.

(2) Positive feedback sequence: It is constructed based on target media contents corresponding to positive interactive behaviors in at least one real-time interactive behavior and a historical interactive behavior, and refers to collection of a media content sequence having positive feedback in a browsing history of the target object.

From a perspective of characterizing an interest of the target object, the interest may usually be divided into a long-term interest and a short-term interest. The foregoing exposure content sequence is characterization of the short-term interest of the target object, because a source of the exposure content sequence is generated from the current search session. For the long-term interest, that historical browsing of the target object continues trace forward is needed. For some target objects browsing a lot, the number of historical browsing is often huge. Putting all the browsing into the model can hardly achieve an expected effect, but may introduce more noise. Therefore, a browsing history of the target object having an explicit or implicit positive feedback behavior may be focused on. The explicit positive feedback includes, for example, an explicit interactive behavior of the target object such as tapping on the media content, commenting, following an author, and liking, while the implicit positive feedback includes, for example, a high playback completion behavior of the target object. By screening the two types of behaviors, a long-term interest of the target object in a positive feedback dimension may be obtained.

In a possible implementation, the positive feedback sequence also maintains a window having a maximum length of M. Each media content in the sequence includes several features: a category feature, a posterior statistical feature, a precise sorting advanced feature and a terminal feature. The features of each media content are combined into a feature vector, a sum of feature dimensions is h, and then features of the entire sequence are combined into an M*h matrix as input to the reordering model.

(3) A negative feedback sequence is constructed based on target media contents corresponding to negative interactive behaviors in the at least one real-time interactive behavior and the historical interactive behavior.

Similar to a design idea of the foregoing positive feedback sequence, negative feedback is also an important component dimension in the long-term interest of the target object. The negative feedback is also divided into two types: explicit negative feedback and implicit negative feedback. An explicit negative feedback behavior includes canceling liking, canceling following, and the like, while an implicit negative feedback behavior may include a quick slashing behavior.

In a possible implementation, the negative feedback sequence maintains a window having a maximum length of M. Each media content in the sequence includes several features: a category feature, a posterior statistical feature, a precise sorting advanced feature and a terminal feature. The features of each media content are combined into a feature vector, a sum of feature dimensions is h, and then features of the entire sequence are combined into an M*h matrix as input to the reordering model.

Step 802: Construct a to-be-sorted content sequence based on each to-be-sorted media content.

In embodiments of this application, the to-be-sorted content sequence is a video sequence that has not been browsed in the current search session, for example, may be media contents that have not been displayed or media contents that the target object has not interacted with. An objective of reordering is to reorder the videos, hoping to increase a playback time length of the entire to-be-sorted content sequence.

In a possible implementation, the to-be-sorted content sequence maintains a window having a length of 2M. Each media content in the to-be-sorted content sequence includes several features: a category feature, a posterior statistical feature, and a precise sorting advanced feature. When the target object continues to browse, so that a length of the to-be-sorted sequence is less than 20, a prefetching process may be triggered. A client requests page turning from a back-end server. A media content and a corresponding feature of a new page are obtained, and are spliced to an end of the to-be-sorted content sequence as a supplement. A sum of feature dimensions of a feature vector of the to-be-sorted content sequence is h2, and the entire sequence may be constructed into a 2M*h2 matrix as input to the reordering model.

Step 803: Determine a degree of interest of the target object in each to-be-sorted media content in the to-be-sorted content sequence by using the reordering model based on a search keyword, a trigger condition type corresponding to the at least one real-time interactive behavior, and the at least one interactive content sequence.

Step 804: Obtain a second content sequence based on each degree of interest, and update a search result page based on the second content sequence.

Figure 9:
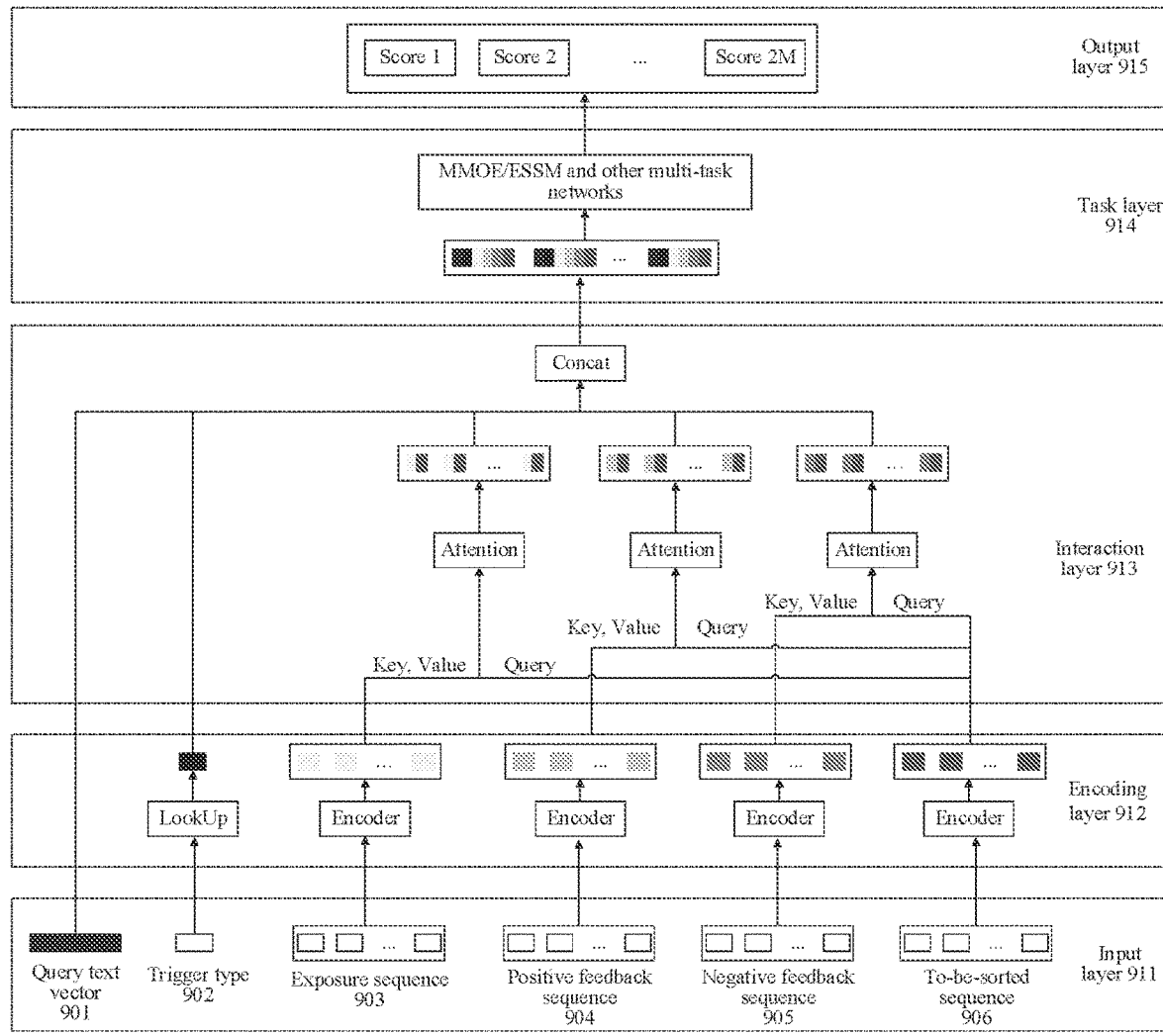
FIG. 9 is a schematic diagram of a model structure of a reordering model according to an embodiment of this application.
Figure 10:
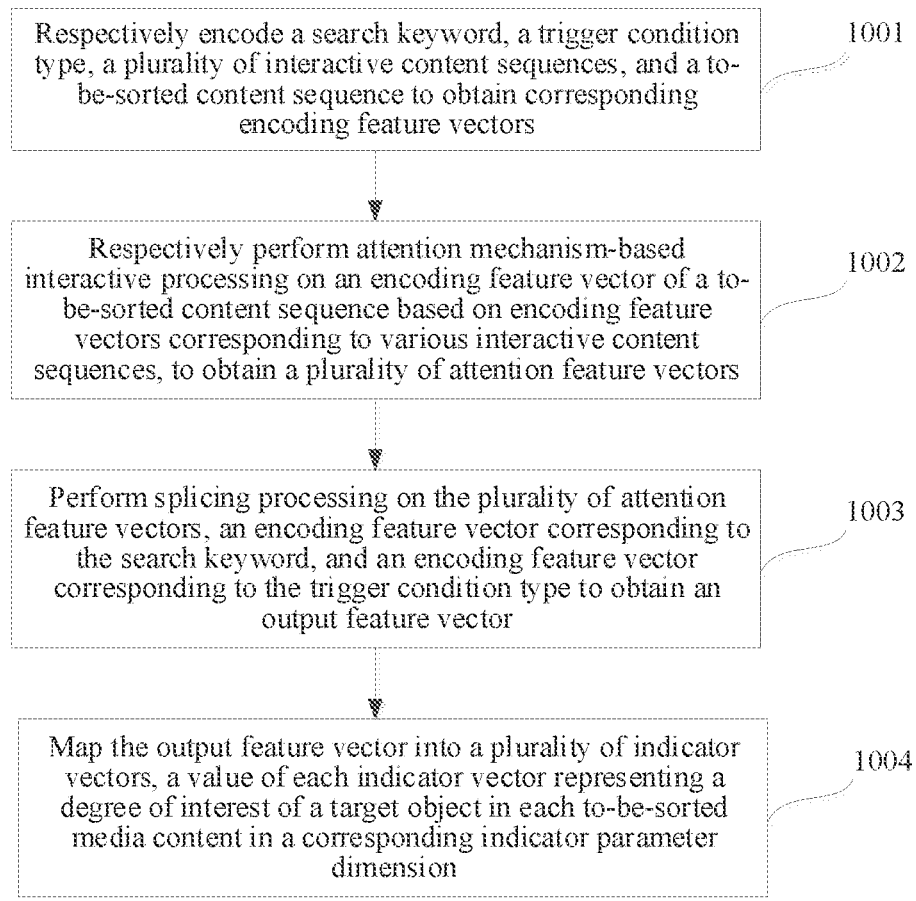
FIG. 10 is a schematic diagram of a processing flow of a reordering model according to an embodiment of this application.

Refer to FIG. 9 and FIG. 10. FIG. 9 is a schematic diagram of a model structure of a reordering model according to an embodiment of this application. The reordering model includes an input layer 911, an encoding layer 912, an interaction layer 913, a task layer 914 and an output layer 915. FIG. 10 is a schematic diagram of a processing flow of a reordering model according to an embodiment of this application. Each layer of the reordering model is described below in combination with the processing flow shown in FIG. 10.

Input data of the input layer 911 of the reordering model includes the following:

(1) Query text vector 901: It refers to a query text vector corresponding to a search keyword of a current search session, and represents semantic information of a query.

In a search scenario, the query is a main expression of a user intention and is necessary as input. Specifically, a query embedding technology may be used. Alternatively, Bert (a text encoding model) or another encoder may be selected as a text encoder, to encode query text into a fixed-length query text vector as input to the reordering model.

(2) Trigger condition type 902: It refers to a corresponding trigger condition type in the foregoing reordering trigger module.

Different trigger condition types represent different behavior accumulation of the target object, and some of the behaviors are positive behaviors and some are negative behaviors, so expectations for subsequent reordering may be different. Therefore, different trigger condition types may influence a sorting policy. For a negative behavior, for example, quick slashing triggering, it is hoped that a subsequent video may make the target object stop the behavior of quick slashing or even quitting. For positive interaction, it is more hoped to recommend some videos similar to a video being interacted with to further satisfy an interest of the target object.

In an implementation, it is considered that the trigger condition type is discrete distribution. An embedding lookup method may be used in the encoding layer 912, to input the trigger condition type into the encoding layer 912 of the model.

(3) Exposure content sequence 903
(4) Positive feedback sequence 904
(5) Negative feedback sequence 905
(6) To-be-sorted content sequence 906

(3) The exposure content sequence 903, (4) the positive feedback sequence 904, and (5) the negative feedback sequence 905 are all interactive content sequences.

The processing flow shown in FIG. 10 includes the following steps:

Step 1001: Respectively encode the search keyword, the trigger condition type, a plurality of interactive content sequences, and the to-be-sorted content sequence to obtain corresponding encoding feature vectors.

In embodiments of this application, a process of step 1001 may be implemented by using the encoding layer 912 of the reordering model. The function of the encoding layer 912 is to perform embedding and serialization encoding on the input data, to extract feature information related to reordering in the input data. Based on different types of input data, a plurality of encoding methods may be included for encoding the different types of input data.

Table 3 is an example of encoding methods for each piece of input data:

TABLE 3

| Input name | Encoding method |
| --- | --- |
| Query text vector 901 | No encoding needed |
| Trigger condition type 902 | Convert to a trigger vector by using Embedding Lookup |
| Exposure content sequence 903 | Encode in a serializing encoding manner |
| Positive feedback sequence 904 | |
| Negative feedback sequence 905 | |
| To-be-sorted content sequence 906 | |

The query text vector 901 does not need to be encoded, and directly represents an encoding feature vector of the search keyword, and is inputted to the interaction layer 903.

Because the trigger condition type 902 is a discrete value, the trigger condition type is usually converted from the discrete value to a vector by the embedding lookup method, to facilitate subsequent processing of a neural network. Other methods of converting a discrete value to a vector is also applicable.

Figure 11:
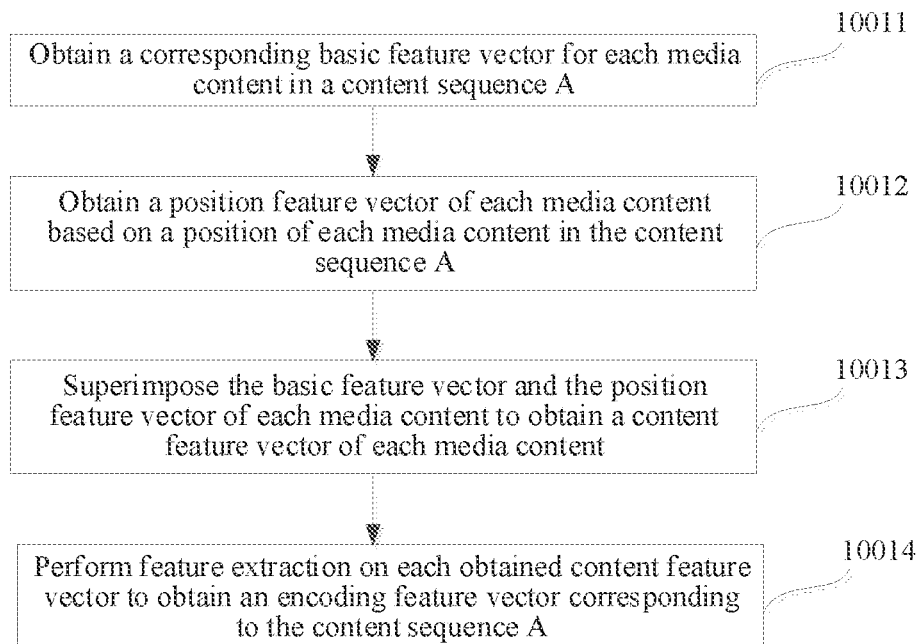
FIG. 11 is a schematic flowchart of feature encoding for a content sequence according to an embodiment of this application.

For the foregoing content sequences 903 to 906, steps shown in FIG. 11 may be used for feature encoding in the serializing encoding manner.

FIG. 11 is a schematic flowchart of feature encoding for a content sequence. Because encoding processes of the foregoing content sequences are similar, one content sequence A is used as an example for detailed description here, and the content sequence A may be any content sequence.

Step 10011: Obtain a corresponding basic feature vector for each media content in the content sequence A.

The basic feature vector is a feature of each target media content inputted by an input layer 911. To be specific, the following feature vectors may be included:

(1) Category feature vector: It is obtained based on a content category to which a target media content belongs.

(2) Terminal feature vector: It is obtained by performing feature extraction based on a terminal feature corresponding to the target media content.

(3) Precise sorting feature vector: It is obtained based on a precise sorting feature vector of the target media content in a precise sorting stage, the precise sorting stage referring to a stage of performing precise sorting based on all information of the media content when a first content sequence is obtained.

Furthermore, the obtained category feature vector, the terminal feature vector, and the precise sorting feature vector are spliced to obtain a basic feature vector corresponding to the target media content.

In other implementation, the basic feature vector may also include other possible feature vectors.

Step 10012: Obtain a position feature vector of each media content based on a position of each media content in the content sequence A.

It is considered that most serializing extraction methods cannot take into account position information of each media content in the sequence. To solve a defect that a serializing extraction method cannot distinguish positions, a position feature vector may be added to a media content at each position. The position feature vector may be fixed, corresponds to the position, may express a position of a current media content in a content sequence, and may not need to be trained.

Step 10013: Superimpose the basic feature vector and the position feature vector of each media content to obtain a content feature vector of each media content.

Figure 12:
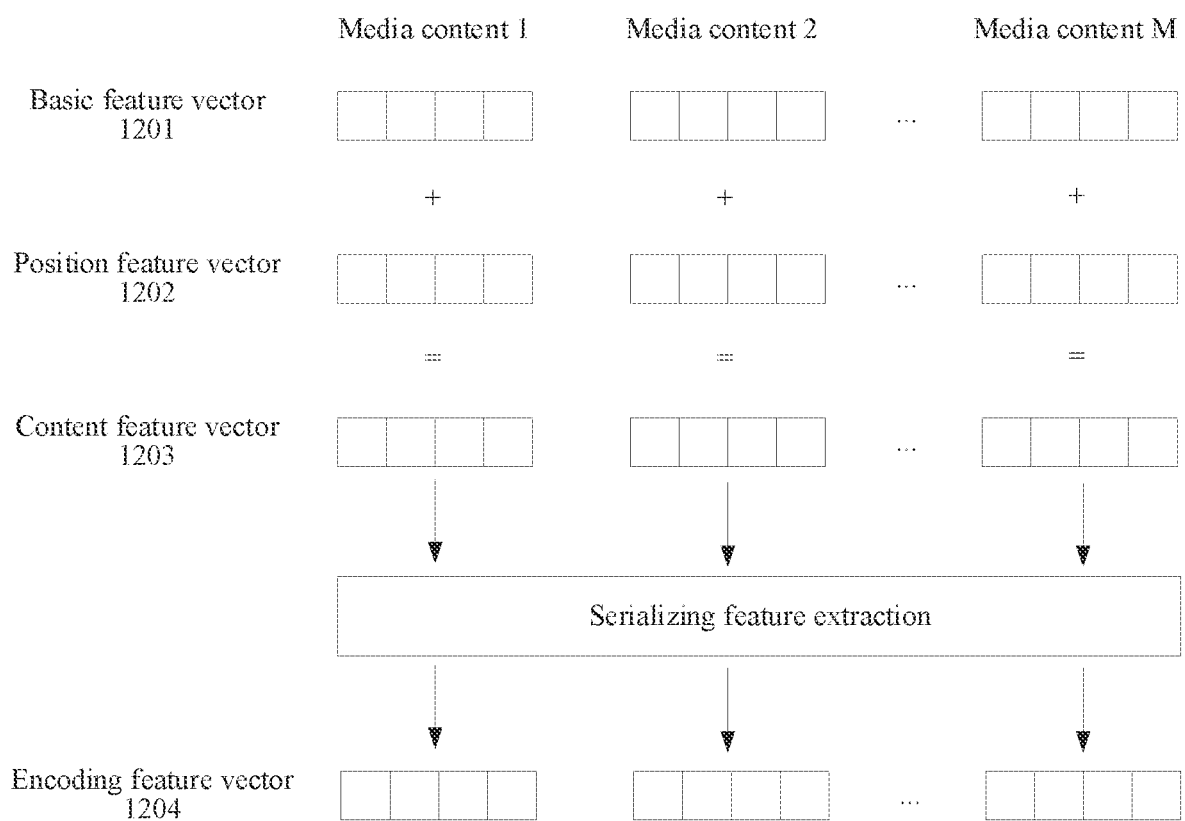
FIG. 12 is a schematic flowchart of a processing process of a feature vector according to an embodiment of this application.

Refer to FIG. 12, a basic feature vector 1201 of each media content may be superimposed with a position feature vector 1202 corresponding to the position of the media content to obtain a corresponding content feature vector 1203.

Specifically, a superimposition method may be performed by summing or pooling. This is not limited in embodiments of this application.

Step 10014: Perform feature extraction on each obtained content feature vector to obtain an encoding feature vector corresponding to the content sequence A.

Refer to FIG. 12, after serializing feature extraction is performed on the obtained content feature vector 1203, a final encoding feature vector 1204 is obtained.

In embodiments of this application, to fuse sequence information into each media content, the serializing encoding manner is used to complete feature extraction. A commonly used serializing encoding manner may be implemented by a recurrent neural network (RNN), a long short-term memory network (LSTM), a transformer, and the like. The same or different serializing encoding manners may be used in different sequences.

For example, the same serializing encoding manner is used in various content sequences. It is considered that a transformer is more direct in modeling an association between item-item. There is no problem of a weak long-term dependency, and a degree of parallelism is better. Therefore, the transformer may be selected as an encoder. In a reordering scenario, the back-end server faces a large number of requests, so performance of the model is critical. Based on this consideration, a scheme that a single-layer transformer is used as a serializing encoder is selected. In practical applications, a multi-layer encoder structure may alternatively be selected.

Figure 13:
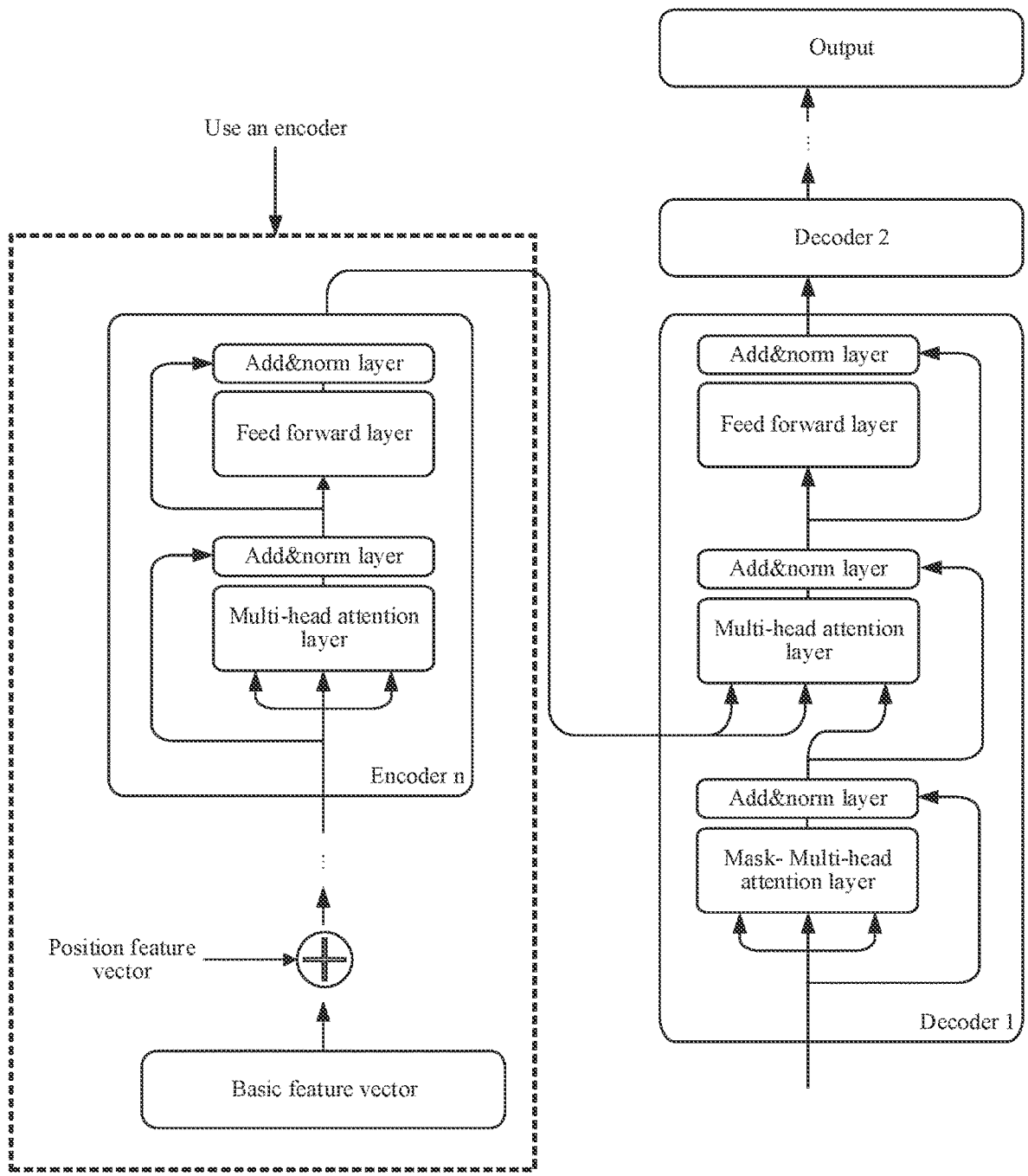
FIG. 13 is a diagram of a structure of a transformer network according to an embodiment of this application.

FIG. 13 is a diagram of a structure of a transformer network. The transformer network includes a plurality of encoders and a plurality of decoders. The plurality of encoders are of a cascade structure. Only a single-layer encoder structure is used in embodiments of this application, that is, an encoder n shown in a dashed box in FIG. 13, n=1. Similarly, only one decoder is used. The content feature vector obtained by superimposing the basic feature vector and the position feature vector is inputted to the encoder 1, and is processed by a multi-head attention layer, then is processed by an add&norm layer, then is inputted to a feed forward layer, and is processed by an add&norm layer, to obtain a final encoding feature vector.

Step 1002: Respectively perform attention mechanism-based interactive processing on an encoding feature vector of the to-be-sorted content sequence based on encoding feature vectors corresponding to various interactive content sequences, to obtain a plurality of attention feature vectors.

In embodiments of this application, a process of step 1002 may be implemented by using an interaction layer 913 of the reordering model. The function of the interaction layer 913 is to enable, based on element interaction between sequences, the media content in the to-be-sorted content sequence to "notice" short-term and long-term interest points, because a historical behavior of the target object may greatly influence current behavior logic.

Specifically, the to-be-sorted content sequence may be subjected to attention interaction processing with the exposure content sequence, the positive feedback sequence, and the negative feedback sequence, respectively.

In a possible implementation, one interactive content sequence B is used as an example, and may be any content sequence in the foregoing at least one interactive content sequence, that is, the exposure content sequence, the positive feedback sequence, or the negative feedback sequence.

Attention interaction processing between the interactive content sequence B and the to-be-sorted content sequence may include the following steps: determining an attention weight based on a similarity between an encoding feature vector of the interactive content sequence B and the encoding feature vector of the to-be-sorted content sequence, to obtain an attention feature vector based on the obtained attention weight and the encoding feature vector of the interactive content sequence B.

In embodiments of this application, an encoding feature vector of a sequence is obtained by splicing encoding feature vectors of media contents included in the sequence.

In a possible implementation, as shown in the interaction layer 913 in FIG. 9, an "attention" method may be used in the transformer, to implement the process of attention interaction processing. The process of attention interaction between the to-be-sorted content sequence and the exposure content sequence is used as an example. Each element of the to-be-sorted content sequence is used as a query, and elements in the exposure content sequence are used as a key and a value. The elements are inputted to the single-layer transformer network. An output vector is obtained as the foregoing attention feature vector. A dimension of the final output vector remains unchanged, but attention information about the exposure content sequence is already included.

Similarly, the to-be-sorted content sequence is calculated by "attention" with the positive feedback sequence and negative feedback sequence respectively, and a corresponding output vector is obtained as a respective attention feature vector.

Step 1003: Perform splicing processing on the plurality of attention feature vectors, an encoding feature vector corresponding to the search keyword, and an encoding feature vector corresponding to the trigger condition type to obtain an output feature vector.

According to the foregoing processes, three attention feature vectors having historical information may be obtained. The three attention feature vectors are spliced with the query text vector 901 and an encoding feature vector corresponding to the trigger condition type 902, and are identified as "Concat" in FIG. 9 as output of the interaction layer 913.

Step 1004: Map the output feature vector into a plurality of indicator vectors, a value of each indicator vector representing a degree of interest of the target object in each to-be-sorted media content in a corresponding indicator parameter dimension.

In embodiments of this application, a process of step 1004 may be implemented by using the task layer 914 of the reordering model. The function of the task layer 914 is to predict values of a plurality of indicators based on the output feature vector.

A video is used as an example. It is considered that a main objective of video reordering is to increase an average playback time length per search session. This objective cannot be directly predicted. Therefore, a plurality of indicators related to this objective may be designed and optimized by a model, to complete optimization of the objective.

Specifically, three prediction tasks are designed for the media content in the to-be-sorted content sequence. Each prediction task is used for predicting a value corresponding to an indicator, and the value is specifically a prediction probability value.

(1) First prediction task: It predicts whether playback of the video is completed. This task is a binary classification task. The playback completion here specifically refers to whether a playback completion degree of the video exceeds a specific threshold. Setting of the threshold is related to a time length of the video.

(2) Second prediction task: It predicts whether the video is quick-slashed. This task is also a binary classification task. The quick slashing here specifically refers to whether the playback completion degree of the video is less than 3 seconds.

(3) Third prediction task: It predicts a playback time length of the media content. This task is a multi-classification task. Because the playback time length of the video is a discrete value, it is apparently difficult to directly predict the discrete value. Therefore, the time length may be subjected to bucket processing. Each bucket corresponds to a time length segment, and then playback time length buckets corresponding to the video are predicted.

Among the three tasks, the third task of predicting the playback time length focuses on optimizing the playback time length of the current video, and the first task of predicting whether the playback of the video is completed and the second task of predicting whether the video is quick-slashed focus on optimizing a length of a playback sequence. To enable the model to simultaneously optimize the three objectives, a multi-task learning method needs to be used for learning.

In a possible implementation, an MMOE algorithm may be used for implementation. To be specific, the output feature vector outputted by the interaction layer 913 is used as input to MMOE, and an MMOE model may output prediction probability values of the foregoing three indicators. The MMOE algorithm may alternatively be implemented by using another possible multi-task deep learning model, such as an entire space multi-task model (ESSM) model, a progressive layered extraction (PLE) model, and a deep user perception network (DUPN) model. This is not limited in embodiments of this application.

Step 1005: Determine the degree of interest in each to-be-sorted media content based on values of the plurality of indicator vectors.

Output of the task layer 914 is a score vector corresponding to the to-be-sorted content sequence, including a score value of each media content corresponding to each prediction task in the to-be-sorted content sequence, that is, the values of the indicator vectors. Then, based on the obtained values of the plurality of indicator vectors, a final score of the target object for each to-be-sorted media content is determined, that is, the degree of interest.

The reordering model corresponds to a training stage and a prediction stage. In the two stages, the processes performed by each layer before the output layer 915 are the same. A difference is that in the training stage, after the values of the plurality of indicator vectors are obtained, a model loss of the entire model may be calculated based on annotated supervision values of the indicator vectors, thereby optimizing and updating a training parameter in the model. For example, a loss function such as a cross entropy loss function may be used as the loss function of the reordering model. Then, the output layer 915 calculates cross entropy losses of the three tasks respectively, and then accumulates the cross entropy losses as an overall loss to optimize the model.

In the prediction stage, the final score (final_score) of the target object for each to-be-sorted media content may be expressed as:

$$\text{final\_score} = \text{playtime} * (\text{finish} - \text{quick})$$

finish represents a prediction probability of playback completion, that is, a value of an indicator corresponding to the first prediction task; quick represents a prediction probability of quick slashing, that is, a value of an indicator corresponding to the second prediction task; and playtime represents a bucket number having a maximum prediction probability of playback, that is, a value of an indicator corresponding to the third prediction task. Furthermore, the to-be-sorted media contents are sorted according to final_score to obtain a second content sequence.

In conclusion, in embodiments of this application, an intelligent triggering solution is designed based on real-time interaction between the target object and the media content, appropriate timing is automatically selected to trigger reordering, and a request is sent to the cloud server. After calculation, the server returns a reordered search result list to the client and presents the search result list to the target object. The solution resolves a problem of untimely feedback on the interactive behavior of the target object in the media content search scenario and adjust the order of the search result in a timely manner, to effectively increase the average time length per search.

The technical solutions of embodiments of this application provide a complete terminal-cloud integrated reordering solution, including the design of the terminal feature, the trigger condition, and the reordering model, having versatility and portability in video, audio, and image-text search scenarios. Through the terminal-cloud collaboration, the search result is adjusted in real time based on the feedback of the target object, achieving personalized effects.

In addition, in embodiments of this application, the foregoing technical effects are verified on service indicators via an experiment. In the experiment, cloud reordering is not performed on a control group, and the cloud reordering described in embodiments of this application is performed on an experimental group. Final experimental results are shown in Table 4 below:

TABLE 4

| | Control group | Experimental group | Time length improvement |
|---|---|---|---|
| Average playback time length per search | 203.214848 seconds | 206.843972 seconds | 2.3981% |

It can be seen that compared with the control group, the experimental group achieves a relative improvement of 2.398% in a main indicator "average playback time length per search", achieving greater gains.

In addition, in the design of the terminal feature in embodiments of this application, the coverage of the terminal feature is effectively improved based on the design of the direct feature and the generalization feature. The reordering model generates a short-term interest sequence and a long-term interest sequence by using the historical browsing behavior. Through the interaction between the attention mechanism of the transformer and the to-be-sorted content sequence, different media contents may be more precisely associated with different interests of the user, improving a personalized effect of the search.

Figure 14:
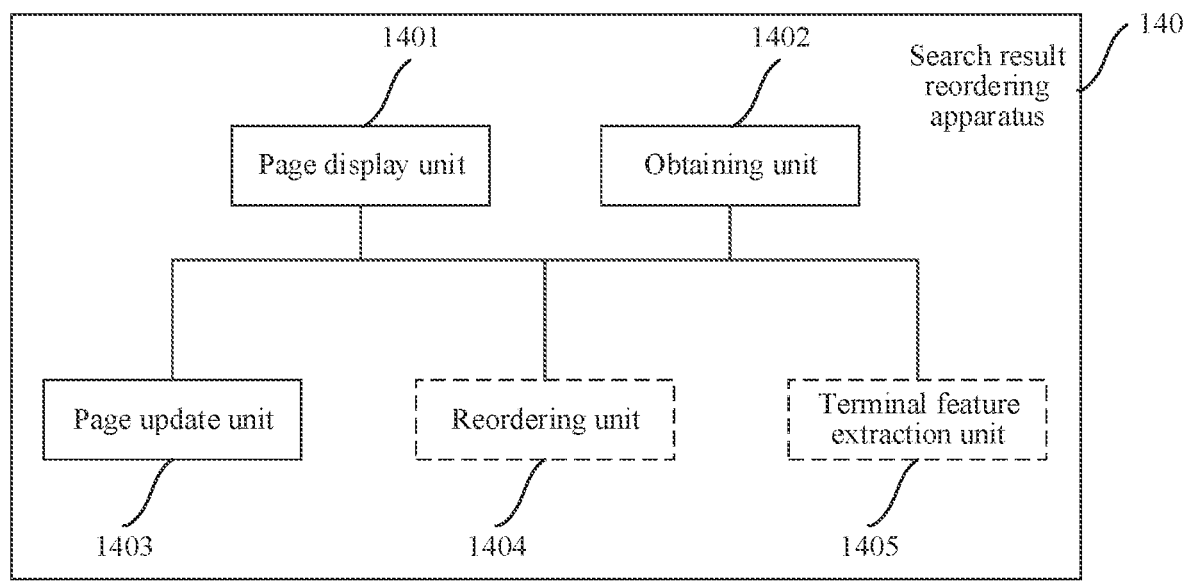
FIG. 14 is a schematic diagram of a structure of a search result reordering apparatus according to an embodiment of this application.

Refer to FIG. 14, based on the same inventive concept, embodiments of this application also provide a search result reordering apparatus 140. The apparatus includes:

a page display unit 1401, configured to display a search result page corresponding to a search session, the search result page displaying a first content sequence obtained based on a search keyword corresponding to the search session, and the first content sequence including a plurality of media contents;

an obtaining unit 1402, configured to obtain at least one real-time interactive behavior performed by a target object on the search result page; and a page update unit 1403, configured to determine media contents other than a target media content associated with the at least one real-time interactive behavior as to-be-sorted media contents in the first content sequence; and reorder the to-be-sorted media contents to obtain a second content sequence when the at least one real-time interactive behavior satisfies a reordering trigger condition, and update the search result page based on the second content sequence.

In one embodiment, the page update unit 1403 is specifically configured to:

update the search result page when the at least one real-time interactive behavior includes at least one of the following interactive behaviors:

triggering display of a sub-result page corresponding to the target media content in the search result page;

triggering toggle display of media contents outside the first content sequence in the search result page;

performing positive interaction on the sub-result page, the positive interaction representing a behavior that the target object is interested in a corresponding media content;

performing negative interaction on the sub-result page, the negative interaction representing a behavior that the target object is not interested in a corresponding media content; and returning to the search result page from the sub-result page.

In one embodiment, the page update unit 1403 is specifically configured to:

obtain reordering trigger prediction data, the reordering trigger prediction data including: at least one of real-time interactive behavior data of the at least one real-time interactive behavior, historical interactive behavior data of the target object, a current load state of a terminal device, and a current network state of the terminal device;

input the reordering trigger prediction data into a reordering trigger prediction model to obtain a prediction result indicating whether to trigger reordering; and reorder the to-be-sorted media contents when the prediction result indicates to trigger reordering.

In one embodiment, the page update unit 1403 is specifically configured to:

initiate a reordering request to a server when the at least one real-time interactive behavior satisfies the reordering trigger condition, the reordering request carrying a terminal feature corresponding to the target media content, and the terminal feature being extracted based on real-time interactive behavior data of the at least one real-time interactive behavior and historical interactive behavior data of the target object; and receive the second content sequence returned by the server in response to the reordering request, the second content sequence being obtained by the server using a reordering model based on the terminal feature.

In one embodiment, the apparatus further includes a reordering unit 1404, configured to:

construct at least one interactive content sequence based on the target media contents corresponding to different interaction types in the at least one real-time interactive behavior, each interactive content sequence corresponding to one interaction type;

construct a to-be-sorted content sequence based on each to-be-sorted media content;

determine a degree of interest of the target object in each to-be-sorted media content in the to-be-sorted content sequence by using a reordering model based on the search keyword, a trigger condition type corresponding to the at least one real-time interactive behavior, and the at least one interactive content sequence.

The page update unit 1403 is specifically configured to obtain the second content sequence based on each degree of interest.

In one embodiment, the reordering unit 1404 is specifically configured to:

respectively encode the search keyword, the trigger condition type, a plurality of interactive content sequences, and the to-be-sorted content sequence to obtain corresponding encoding feature vectors;

respectively perform attention mechanism-based interactive processing on an encoding feature vector of the to-be-sorted content sequence based on encoding feature vectors corresponding to various interactive content sequences, to obtain a plurality of attention feature vectors;

perform splicing processing on the plurality of attention feature vectors, an encoding feature vector corresponding to the search keyword, and an encoding feature vector corresponding to the trigger condition type to obtain an output feature vector; and map the output feature vector into a plurality of indicator vectors, and determine the degree of interest in each to-be-sorted media content based on values of the plurality of indicator vectors. Each indicator vector corresponds to an indicator parameter dimension, and a value of each indicator vector represents the degree of interest of the target object in each to-be-sorted media content in a corresponding indicator parameter dimension.

In one embodiment, the reordering unit 1404 is specifically configured to:

obtain a corresponding basic feature vector for each media content in the content sequence;

obtain a position feature vector of each media content based on a position of each media content in the content sequence;

superimpose the basic feature vector and the position feature vector of each media content to obtain a content feature vector of each media content; and perform feature extraction on each obtained content feature vector to obtain an encoding feature vector corresponding to the content sequence.

In one embodiment, the apparatus further includes a terminal feature extraction unit 1405, configured to:

extract, based on real-time interactive behavior data of the at least one real-time interactive behavior and historical interactive behavior data of the target object, a terminal feature corresponding to each target media content, the terminal feature being used for representing an interaction tendency of the target object for the search session.

The reordering unit 1404 is specifically configured to:
obtain a corresponding category feature vector based on a content category to which the media content belongs;
perform feature extraction based on a terminal feature corresponding to the media content to obtain a corresponding terminal feature vector;
obtain a precise sorting feature vector of the media content in a precise sorting stage, the precise sorting stage referring to a stage of performing precise sorting based on all information of the media content when the first content sequence is obtained; and
splice the category feature vector, the terminal feature vector, and the precise sorting feature vector to obtain the basic feature vector.

In one embodiment, the terminal feature extraction unit 1405 is specifically configured to:
extract a first type of feature set of each target media content from the real-time interactive behavior data;
determine an associated data set of each target media content from the historical interactive behavior data, the associated data set of each target media content including historical interactive data corresponding to a media content having a same attribute as the associated data set;
extract a second type of feature set of each target media content based on each obtained associated data set; and
obtain a terminal feature of each target media content based on the obtained first type of feature set and the second type of feature set.

In one embodiment, the reordering unit 1404 is specifically configured to:
respectively perform the following steps for each interactive content sequence:
determining an attention weight based on a similarity between an encoding feature vector of the interactive content sequence and the encoding feature vector of the to-be-sorted content sequence; and
obtaining the attention feature vectors based on the attention weight and the encoding feature vector of the interactive content sequence.

In one embodiment, the reordering unit 1404 is specifically configured to:
construct an exposure content sequence based on the target media content displayed in the search result page;
construct a positive feedback sequence based on target media contents corresponding to positive interactive behaviors in the at least one real-time interactive behavior and the historical interactive behavior; and
construct a negative feedback sequence based on target media contents corresponding to negative interactive behaviors in the at least one real-time interactive behavior and the historical interactive behavior.

By using the foregoing apparatus, an order of media contents in a search result is adjusted based on an instant interest, to improve accuracy of result presentation of this search session and satisfy a search intention of the user in a timely manner, thereby improving content search efficiency, and timeliness of feedback on an interactive behavior of the target object is also improved.

The apparatus may be configured to perform the method shown in embodiments of this application. Therefore, for the functions that can be implemented by functional modules of the apparatus, which are not described herein again, refer to the descriptions of the foregoing embodiments.

Figure 15:
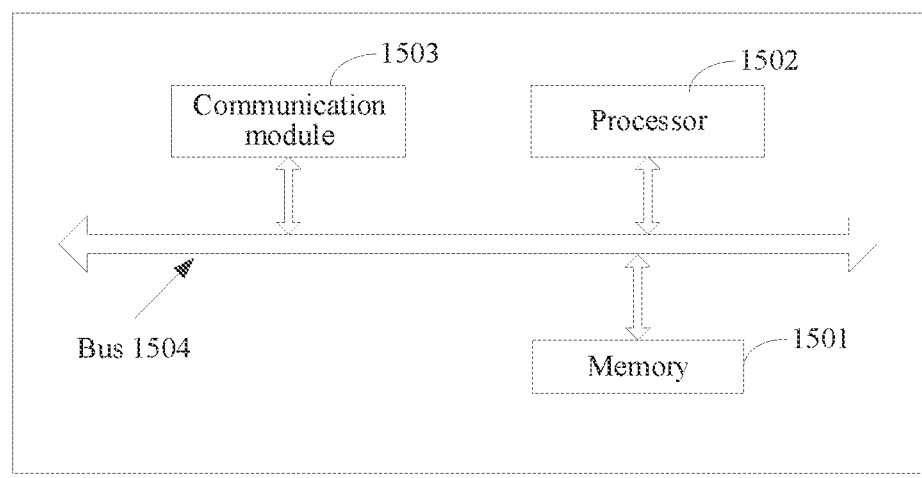
FIG. 15 is a schematic diagram of a composition structure of a computer device according to an embodiment of this application.

Refer to FIG. 15, based on the same technical concept, embodiments of this application also provide a computer device. In an embodiment, the computer device may be a device corresponding to the server shown in FIG. 1 or the cloud shown in FIG. 2. The computer device, as shown in FIG. 15, includes a memory 1501, a communication module 1503, and at least one processor 1502.

The memory 1501 is configured to store a computer program executed by the processor 1502. The memory 1501 may mainly include a program storage area and a data storage area. The program storage area may store an operating system, a program required for running an instant messaging function, and the like. The data storage area may store various instant messaging information, operation instruction sets, and the like.

The memory 1501 may be a volatile memory such as a random-access memory (RAM). The memory 1501 may alternatively be a non-volatile memory such as a read-only memory, a flash memory, a hard disk drive (HDD), or a solid-state drive (SSD). Alternatively, the memory 1501 is any other medium that can be used to carry or store expected program codes in a form of instructions or a data structure and that can be accessed by a computer, but is not limited thereto. The memory 1501 may be a combination of the foregoing memories.

The processor 1502 may include at least one central processing unit (CPU), a digital processing unit, or the like. The processor 1502 is configured to implement the foregoing search result reordering method when calling the computer program stored in the memory 1501.

The communication module 1503 is configured to communicate with a terminal device and another server.

A specific connection medium between the memory 1501, the communication module 1503, and the processor 1502 is not limited in embodiments of this application. In embodiments of this application, in FIG. 15, the memory 1501 and the processor 1502 are connected via a bus 1504. The bus 1504 is described in a bold line in FIG. 15. A connection manner between other components is merely an example for description, and is not limited thereto. The bus 1504 may be classified into an address bus, a data bus, a control bus, and the like. For case of description, only one bold line is used to describe the bus in FIG. 15, but this does not mean that there is only one bus or only one type of bus.

A computer storage medium is stored in the memory 1501, and computer executable instructions are stored in the computer storage medium. The computer executable instructions are used for implementing the search result reordering method of embodiments of this application, and the processor 1502 is configured to perform the search result reordering method of the foregoing embodiments.

Figure 16:
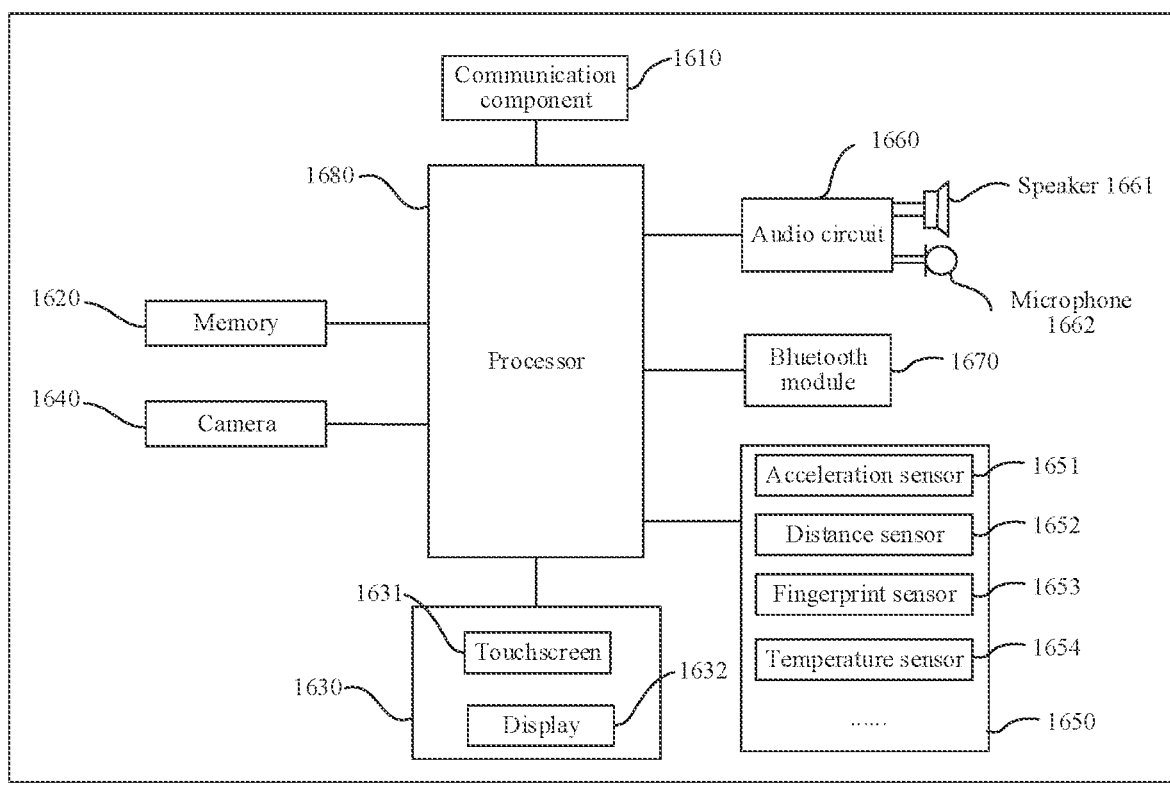
FIG. 16 is a schematic diagram of a composition structure of another computer device applying an embodiment of this application.

In another embodiment, the computer device may alternatively be a terminal device, such as the terminal device shown in FIG. 1. In this embodiment, the structure of the computer device may be as shown in FIG. 16, including: a communication component 1610, a memory 1620, a display unit 1630, a camera 1640, a sensor 1650, an audio circuit 1660, a Bluetooth module 1670, a processor 1680, and other components.

The communication component 1610 is configured to communicate with the server. In some embodiments, a circuit wireless fidelity (Wi-Fi) module may be included. The Wi-Fi module belongs to a short-distance wireless transmission technology, and the computer device can help a user send and receive information via the Wi-Fi module.

The memory 1620 may be configured to store a software program and data. The processor 1680 runs the software program and the data stored in the memory 1620, to implement various functions and data processing of the terminal device. The memory 1620 may include a high-speed random access memory, and may further include a non-volatile memory such as at least one magnetic disk storage device, a flash memory device, or another volatile solid storage device. The memory 1620 stores an operating system that enables the terminal device to run. In this application, the memory 1620 may store the operating system and various application programs, and may also store codes that execute the search result reordering method of embodiments of this application.

The display unit 1630 may also be configured to display information inputted by the user or information provided to the user and a graphical user interface (GUI) of various menus of the terminal device. Specifically, the display unit 1630 may include a display screen 1632 disposed on the front of the terminal device. The display screen 1632 may be configured in a form of a liquid crystal display, an organic light-emitting diode and the like. The display unit 1630 may be configured to display various search result pages or sub-result pages in embodiments of this application.

The display unit 1630 may also be configured to receive inputted digit or character information, and generate a signal input related to the user setting and function control of the terminal device. Specifically, the display unit 1630 may include a touchscreen 1631 disposed on the front of the terminal device, and a user's touch operation on or near the touchscreen 1631 may be collected, such as tapping a button and dragging a scroll box.

The touchscreen 1631 may be overlaid on the display screen 1632. Alternatively, the touchscreen 1631 and the display screen 1632 may be integrated to achieve input and output functions of the terminal device, and may be referred to as a touch display screen after integration. In this application, the display unit 1630 may display an application program and a corresponding operation step.

The camera 1640 may be configured to capture a static image, and the user may post a comment on the image captured by the camera 1640 through the application. There may be one or more cameras 1640. An optical image of an object generated through a lens is projected to a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the processor 1680. The processor 1680 converts the electrical signal into a digital image signal.

The terminal device may also include at least one sensor 1650, such as an acceleration sensor 1651, a distance sensor 1652, a fingerprint sensor 1653, and a temperature sensor 1654. The terminal device may also be configured with another sensor such as a gyroscope, a barometer, a hygrometer, a thermometer, an infrared sensor, a light sensor, and a motion sensor.

The audio circuit 1660, a speaker 1661, and a microphone 1662 may provide audio interfaces between the user and the terminal device. The audio circuit 1660 may convert received audio data into an electrical signal and transmit the electrical signal to the speaker 1661. The speaker 1661 converts the electrical signal into a sound signal and output the sound signal. The terminal device may also be configured with a volume button to adjust a volume of the sound signal. The microphone 1662 converts a collected sound signal into an electrical signal. The audio circuit 1660 receives the electrical signal, converts the electrical signal into audio data, and outputs the audio data to the communication component 1610 to be transmitted to, for example, another terminal device, or outputs the audio data to the memory 1620 for further processing.

The Bluetooth module 1670 is configured to perform information interaction with another Bluetooth device having a Bluetooth module based on a Bluetooth protocol. For example, the terminal device may establish a Bluetooth connection with a wearable computer device (such as a smartwatch) that also has a Bluetooth module via the Bluetooth module 1670 to perform data exchange.

The processor 1680 is a control center of the terminal device, and is connected to various parts of the terminal by using various interfaces and lines. By running or executing the software program stored in the memory 1620 and invoking data stored in the memory 1620, various functions and data processing of the terminal device is performed. In some embodiments, the processor 1680 may include at least one processing unit. The processor 1680 may also integrate an application processor and a baseband processor. The application processor mainly processes an operating system, a user interface, an application program, and the like. The baseband processor mainly processes wireless communication. The foregoing baseband processor may either not be integrated into the processor 1680. In this application, the processor 1680 may run the operating system, the application program, user interface display, touch response, and the search result reordering method of embodiments of this application. In addition, the processor 1680 is coupled with the display unit 1630.

Based on the same inventive concept, embodiments of this application also provide a storage medium that stores a computer program. The computer program, when running on a computer, enables the computer to perform steps in the search result reordering method according to various exemplary implementations of this application described in this specification.

In some possible implementations, various aspects of the search result reordering method provided in this application may also be implemented in a form of a computer program product, including a computer program. When the program product is run on a computer device, the computer program is used for enabling the computer device to perform the steps in the search result reordering method according to various exemplary implementations of this application described in this specification. For example, the computer device may perform the steps of each embodiment.

The program product may be any combination of at least one readable medium. The readable medium may be a readable signal medium or a readable storage medium. The readable storage medium may be, for example, but is not limited to, electric, magnetic, optical, electromagnetic, infrared, or semiconductor systems, apparatuses, or devices, or any combination thereof. More specific example (a non-exhaustive list) of the readable storage medium include: an electrical connection having at least one wire, a portable disk, a hard disk, a random access memory (RAM), a read-only memory (ROM), an erasable programmable ROM (EPROM or a flash memory), an optical fiber, a compact disc ROM (CD-ROM), an optical storage device, a magnetic storage device, or any appropriate combination thereof.

The program product of implementations of this application may adopt the portable compact disc ROM (CD-ROM) and include the computer program, and may be run on the computer device. However, the program product in this application is not limited thereto. In this application, the readable storage medium may be any tangible medium including or storing a program, and the computer program stored may be used by or used in combination with a command execution system, an apparatus, or a device.

The readable signal medium may include a data signal that is in a baseband or transmitted as a part of a carrier, and the data signal carries a computer-readable program. A data signal propagated in such a way may use a plurality of forms, including, but not limited to, an electromagnetic signal, an optical signal, or any appropriate combination thereof. The readable signal medium may alternatively be any readable medium other than a readable storage medium, and the readable medium may be used to send, propagate, or transmit a program used by or in combination with a command execution system, apparatus, or device.

The computer program included in the readable medium may be transmitted by using any suitable medium, including, but not limited to, wireless, wired, an optical cable, RF, or any appropriate combination thereof.

The computer program for performing the operation of this application may be written by using any combination of one or more programming languages. The programming language includes an object-oriented programming language such as Java and C++, and includes a conventional procedural programming language such as a "C" Language or a similar programming language.

Although several units or subunits of the apparatus are mentioned in the foregoing detailed descriptions, the division is merely illustrative not mandatory. Actually, according to the implementations of this application, the features and functions of two or more units described above may be specifically implemented in one unit. On the contrary, the features and functions of one unit described above may be further divided to be embodied by a plurality of units.

In addition, although the steps of the method in this application are described in a specific order in the accompanying drawings, this does not require or imply that the steps are bound to be performed in the specific order, or all the operations shown are bound to be performed to achieve the expected result. Additionally or alternatively, some steps may be omitted, a plurality of steps may be combined into one step for execution, and/or one step may be decomposed into a plurality of steps for execution.

A person skilled in the art should understand that embodiments of this application may be provided as a method, a system, or a computer program product. Therefore, this application may use a form of hardware-only embodiments, software-only embodiments, or embodiments combining software and hardware. Moreover, this application may use a form of a computer program product that is implemented on as least one computer-usable storage media (including but not limited to a disk memory, a CD-ROM, an optical memory, and the like) in which computer-usable program code is included.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. Although exemplary embodiments of this application have been described, a person skilled in the art who knows the basic inventive concept can make additional changes and modifications to these embodiments. Therefore, the following claims are intended to be construed as to cover the exemplary embodiments and all changes and modifications falling within the scope of this application.

Apparently, a person skilled in the art can make various modifications and variations to this application without departing from the spirit and scope of this application. In this way, provided that these modifications and variations made to this application fall within the scope of the claims of this application and equivalent techniques thereof, this application is also intended to cover such modifications and variations.

What is claimed is:

1. A search result reordering method performed by a computer device, the method comprising:

displaying a search result page corresponding to a search session, the search result page including a plurality of media content based on a search keyword corresponding to the search session and the plurality of media content including an ordered sequence of a first target media content, a second target media content and a third target media content based on their relevance to the search keyword;

obtaining at least one real-time interactive behavior performed by a target object on the first target media content in the search result page, the at least one real-time interactive behavior comprising a sequence of interactions including:
launching a separate window on top of the search result page;
browsing the first target media content in the separate window; and
closing the separate window after the browsing of the first target media is finished;

determining that the third target media content other than the second target media content is more relevant to the search keyword based on the at least one real-time interactive behavior;

identifying the second target media content and the third target media content as to-be-sorted media content in the search result page; and updating the ordered sequence in the search result page by reordering locations of the to-be- sorted media content such that the third target media content is ahead of the second target media content within the updated ordered sequence, comprising:
constructing at least one interactive content sequence based on the first target media content corresponding to different interaction types in the at least one real-time interactive behavior, each interactive content sequence corresponding to one interaction type;
constructing a to-be-sorted content sequence based on each to-be-sorted media content;
determining a degree of interest of the target object in each to-be-sorted media content in the to-be-sorted content sequence by using a reordering model based on the search keyword, a trigger condition type corresponding to the at least one real-time interactive behavior, and the at least one interactive content sequence;
respectively encoding the search keyword, the trigger condition type, a plurality of interactive content sequences, and the to-be-sorted content sequence to obtain corresponding encoding feature vectors;
respectively performing attention mechanism-based interactive processing on an encoding feature vector of the to-be-sorted content sequence based on encoding feature vectors corresponding to various interactive content sequences, to obtain a plurality of attention feature vectors;
performing splicing processing on the plurality of attention feature vectors, an encoding feature vector corresponding to the search keyword, and an encoding feature vector corresponding to the trigger condition type to obtain an output feature vector;
mapping the output feature vector into a plurality of indicator vectors, and determining the degree of interest in each to-be-sorted media content based on values of the plurality of indicator vectors, each indicator vector corresponding to an indicator parameter dimension, and a value of each indicator vector representing the degree of interest of the target object in each to-be-sorted media content in a corresponding indicator parameter dimension; and
obtaining a reordered to-be-sorted media content based on each degree of interest.

2. The method according to claim 1, wherein:
the at least one real-time interactive behavior comprises at least one of the following interactive behaviors:
triggering display of a sub-result page corresponding to the first target media content in the search result page;
performing positive interaction on the sub-result page, the positive interaction representing a behavior that the target object is interested in a corresponding media content; and
performing negative interaction on the sub-result page, the negative interaction representing a behavior that the target object is not interested in a corresponding media content.

3. The method according to claim 1, wherein the updating the ordered sequence in the search result page by reordering the locations of the to-be-sorted media content such that the third target media content is ahead of the second target media content within the updated ordered sequence further comprises:
initiating a reordering request to a server, the reordering request carrying a terminal feature corresponding to the first target media content, and the terminal feature being extracted based on real-time interactive behavior data of the at least one real-time interactive behavior and historical interactive behavior data of the target object; and
receiving the reordered to-be-sorted media content returned by the server in response to the reordering request, the reordered to-be-sorted media content being obtained by the server using the reordering model based on the terminal feature.

4. The method according to claim 1, wherein the constructing at least one interactive content sequence based on the first target media content corresponding to different interaction types in the at least one real-time interactive behavior comprises:
constructing an exposure content sequence based on the first target media content displayed in the search result page;
constructing a positive feedback sequence based on the first target media content corresponding to positive interactive behaviors in the at least one real-time interactive behavior and historical interactive behavior; and
constructing a negative feedback sequence based on the first target media content corresponding to negative interactive behaviors in the at least one real-time interactive behavior and the historical interactive behavior.

5. A computer device, comprising a memory, a processor, and a computer program that is stored in the memory and is executable on the processor, the processor, when executing the computer program, causing the computer device to implement a search result reordering method including:
displaying a search result page corresponding to a search session, the search result page including a plurality of media content based on a search keyword corresponding to the search session and the plurality of media content including an ordered sequence of a first target media content, a second target media content and a third target media content based on their relevance to the search keyword;
obtaining at least one real-time interactive behavior performed by a target object on the first target media content in the search result page, the at least one real-time interactive behavior comprising a sequence of interactions including:
launching a separate window on top of the search result page;
browsing the first target media content in the separate window; and
closing the separate window after the browsing of the first target media is finished;
determining that the third target media content other than the second target media content is more relevant to the search keyword based on the at least one real-time interactive behavior;
identifying the second target media content and the third target media content as to-be-sorted media content in the search result page; and
updating the ordered sequence in the search result page by reordering locations of the to-be-sorted media content such that the third target media content is ahead of the second target media content within the updated ordered sequence, comprising:
constructing at least one interactive content sequence based on the first target media content corresponding to different interaction types in the at least one real-time interactive behavior, each interactive content sequence corresponding to one interaction type;
constructing a to-be-sorted content sequence based on each to-be-sorted media content;
determining a degree of interest of the target object in each to-be-sorted media content in the to-be-sorted content sequence by using a reordering model based on the search keyword, a trigger condition type corresponding to the at least one real-time interactive behavior, and the at least one interactive content sequence;
respectively encoding the search keyword, the trigger condition type, a plurality of interactive content sequences, and the to-be-sorted content sequence to obtain corresponding encoding feature vectors;
respectively performing attention mechanism-based interactive processing on an encoding feature vector of the to-be-sorted content sequence based on encoding feature vectors corresponding to various interactive content sequences, to obtain a plurality of attention feature vectors;
performing splicing processing on the plurality of attention feature vectors, an encoding feature vector corresponding to the search keyword, and an encoding feature vector corresponding to the trigger condition type to obtain an output feature vector;

mapping the output feature vector into a plurality of indicator vectors, and determining the degree of interest in each to-be-sorted media content based on values of the plurality of indicator vectors, each indicator vector corresponding to an indicator parameter dimension, and a value of each indicator vector representing the degree of interest of the target object in each to-be-sorted media content in a corresponding indicator parameter dimension; and obtaining a reordered to-be-sorted media content based on each degree of interest.

6. The computer device according to claim 5, wherein:

the at least one real-time interactive behavior comprises at least one of the following interactive behaviors:

triggering display of a sub-result page corresponding to the first target media content in the search result page;

performing positive interaction on the sub-result page, the positive interaction representing a behavior that the target object is interested in a corresponding media content; and performing negative interaction on the sub-result page, the negative interaction representing a behavior that the target object is not interested in a corresponding media content.

7. The computer device according to claim 5, wherein the updating the ordered sequence in the search result page by reordering the locations of the to-be-sorted media content such that the third target media content is ahead of the second target media content within the updated ordered sequence further comprises:

initiating a reordering request to a server, the reordering request carrying a terminal feature corresponding to the first target media content, and the terminal feature being extracted based on real- time interactive behavior data of the at least one real-time interactive behavior and historical interactive behavior data of the target object; and receiving the reordered to-be-sorted media content returned by the server in response to the reordering request, the reordered to-be-sorted media content being obtained by the server using the reordering model based on the terminal feature.

8. The computer device according to claim 5, wherein the constructing at least one interactive content sequence based on the first target media content corresponding to different interaction types in the at least one real-time interactive behavior comprises:

constructing an exposure content sequence based on the first target media content displayed in the search result page;

constructing a positive feedback sequence based on the first target media content corresponding to positive interactive behaviors in the at least one real-time interactive behavior and historical interactive behavior; and constructing a negative feedback sequence based on the first target media content corresponding to negative interactive behaviors in the at least one real-time interactive behavior and the historical interactive behavior.

9. A non-transitory computer storage medium, having a computer program stored thereon, the computer program, when executed by a processor of a computer device, causing the computer device to implement a search result reordering method including:

displaying a search result page corresponding to a search session, the search result page including a plurality of media content based on a search keyword corresponding to the search session and the plurality of media content including an ordered sequence of a first target media content, a second target media content and a third target media content based on their relevance to the search keyword;

obtaining at least one real-time interactive behavior performed by a target object on the first target media content in the search result page, the at least one real-time interactive behavior comprising a sequence of interactions including:

launching a separate window on top of the search result page;

browsing the first target media content in the separate window; and closing the separate window after the browsing of the first target media is finished;

determining that the third target media content other than the second target media content is more relevant to the search keyword based on the at least one real-time interactive behavior;

identifying the second target media content and the third target media content as to-be-sorted media content in the search result page; and updating the ordered sequence in the search result page by reordering locations of the to-be-sorted media content such that the third target media content is ahead of the second target media content within the updated ordered sequence, comprising:

constructing at least one interactive content sequence based on the first target media content corresponding to different interaction types in the at least one real-time interactive behavior, each interactive content sequence corresponding to one interaction type;

constructing a to-be-sorted content sequence based on each to-be-sorted media content;

determining a degree of interest of the target object in each to-be-sorted media content in the to-be-sorted content sequence by using a reordering model based on the search keyword, a trigger condition type corresponding to the at least one real-time interactive behavior, and the at least one interactive content sequence;

respectively encoding the search keyword, the trigger condition type, a plurality of interactive content sequences, and the to-be-sorted content sequence to obtain corresponding encoding feature vectors;

respectively performing attention mechanism-based interactive processing on an encoding feature vector of the to-be-sorted content sequence based on encoding feature vectors corresponding to various interactive content sequences, to obtain a plurality of attention feature vectors;

performing splicing processing on the plurality of attention feature vectors, an encoding feature vector corresponding to the search keyword, and an encoding feature vector corresponding to the trigger condition type to obtain an output feature vector;

mapping the output feature vector into a plurality of indicator vectors, and determining the degree of interest in each to-be-sorted media content based on values of the plurality of indicator vectors, each indicator vector corresponding to an indicator parameter dimension, and a value of each indicator vector representing the degree of interest of the target object in each to-be-sorted media content in a corresponding indicator parameter dimension; and obtaining a reordered to-be-sorted media content based on each degree of interest.

10. The non-transitory computer storage medium according to claim 9, wherein:

the at least one real-time interactive behavior comprises at least one of the following interactive behaviors:

triggering display of a sub-result page corresponding to the first target media content in the search result page;

performing positive interaction on the sub-result page, the positive interaction representing a behavior that the target object is interested in a corresponding media content; and performing negative interaction on the sub-result page, the negative interaction representing a behavior that the target object is not interested in a corresponding media content.

11. The non-transitory computer storage medium according to claim 9, wherein the updating the ordered sequence in the search result page by reordering the locations of the to-be-sorted media content such that the third target media content is ahead of the second target media content within the updated ordered sequence further comprises:

initiating a reordering request to a server, the reordering request carrying a terminal feature corresponding to the first target media content, and the terminal feature being extracted based on real-time interactive behavior data of the at least one real-time interactive behavior and historical interactive behavior data of the target object; and receiving the reordered to-be-sorted media content returned by the server in response to the reordering request, the reordered to-be-sorted media content being obtained by the server using the reordering model based on the terminal feature.

12. The non-transitory computer storage medium according to claim 9, wherein the constructing at least one interactive content sequence based on the first target media content corresponding to different interaction types in the at least one real-time interactive behavior comprises:

constructing an exposure content sequence based on the first target media content displayed in the search result page;

constructing a positive feedback sequence based on the first target media content corresponding to positive interactive behaviors in the at least one real-time interactive behavior and the historical interactive behavior; and constructing a negative feedback sequence based on the first target media content corresponding to negative interactive behaviors in the at least one real-time interactive behavior and the historical interactive behavior.

* * * * *